United States Patent
Weng et al.

(10) Patent No.: US 10,343,279 B2
(45) Date of Patent: Jul. 9, 2019

(54) NAVIGATIONAL CONTROL OF ROBOTIC SYSTEMS AND OTHER COMPUTER-IMPLEMENTED PROCESSES USING DEVELOPMENTAL NETWORK WITH TURING MACHINE LEARNING

(71) Applicant: Board of Trustees of Michigan State University, East Lansing, MI (US)

(72) Inventors: Juyang Weng, Okemos, MI (US); Zejia Zheng, East Lansing, MI (US); Xie He, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 354 days.

(21) Appl. No.: 15/205,324

(22) Filed: Jul. 8, 2016

(65) Prior Publication Data
US 2017/0008168 A1   Jan. 12, 2017

Related U.S. Application Data

(60) Provisional application No. 62/191,092, filed on Jul. 10, 2015.

(51) Int. Cl.
*B25J 9/16* (2006.01)
*G06N 3/00* (2006.01)
*G06N 3/08* (2006.01)

(52) U.S. Cl.
CPC .............. *B25J 9/163* (2013.01); *B25J 9/161* (2013.01); *G06N 3/008* (2013.01); *G06N 3/08* (2013.01); *Y10S 901/01* (2013.01); *Y10S 901/47* (2013.01)

(58) Field of Classification Search
CPC ................................. B25J 9/163; B25J 9/161
See application file for complete search history.

(56) References Cited

U.S. PATENT DOCUMENTS

| | | | |
|---|---|---|---|
| 6,081,273 A | 6/2000 | Weng et al. | |
| 6,353,814 B1 | 3/2002 | Weng | |
| 7,711,663 B2 | 5/2010 | Weng | |
| 8,694,449 B2 | 4/2014 | Weng et al. | |
| 9,015,093 B1 * | 4/2015 | Commons | G01C 21/3602 706/26 |
| 9,195,934 B1 * | 11/2015 | Hunt | G06N 3/02 |
| 2005/0021224 A1 * | 1/2005 | Gray | B60H 1/00771 701/36 |

(Continued)

OTHER PUBLICATIONS

Weng, J., et al. "Developmental Robots: Theory, Method and Experimental Results," in Proc. 2nd Int'l Symposium on Humanoid Robots, Tokyo, Japan, pp. 57- 64, Oct. 8-9, 1999.

(Continued)

*Primary Examiner* — Marc Anthony Armand
(74) *Attorney, Agent, or Firm* — Harness, Dickey & Pierce, PLC

(57) ABSTRACT

The Developmental Network incorporates a Turing Machine that injects teaching instructions directly into the skull-closed network. The Developmental Network can also autonomously learn directly from the natural world without the need for a human to encode its input and output. The neural network so configured can be used as a controller for robotic and other computer control applications where the neural network is organized into plural X-Y-Z areas receiving signals from sensors and providing signals to effectors.

20 Claims, 13 Drawing Sheets

(56) References Cited

U.S. PATENT DOCUMENTS

2014/0258195 A1  9/2014  Weng et al.

OTHER PUBLICATIONS

Weng, J. et al., Developmental Humanoids: Humanoids that Develop Skills Automatically, in the Proc. the first IEEE-RAS International Conference on Humanoid Robots, Cambridge, MIT, Sep. 7-8, 2000.

Zhang, Y., et al., "Grounded Auditory Development by a Developmental Robot," in Proc. INNS/IEEE International Joint Conference of Neural Networks 2001 (IJCNN 2001), Washington DC, pp. 1059-1064, Jul. 14-19, 2001.

Weng, J., "A Theory for Mentally Developing Robots," in Proc. 2nd International Conference on Development and Learning, Jun. 12-15, MIT, Cambridge, MA, IEEE Computer Society Press, 2002.

Weng, J., "Developmental Robotics: Theory and Experiments" International Journal of Humanoid Robotics, vol. 1, No. 2, 2004.

Weng, J., "Symbolic Models and Emergent Models: A Review," IEEE Transactions on Autonomous Mental Development, vol. 4, No. 1, pp. 29-53, 2012.

Weng, J., "The Living Machine Initiative," Technical Report MSU-CPS-96-60, Department of Computer Science, MSU, Dec. 1996.

Weng, J., "A General Purpose Brain Model for Developmental Robots: The Spatial Brain for Any Temporal Lengths," in Proc. IEEE International Conference on Robotics and Automation, Workshop on Bio-Inspired Self-Organizing Robotic Systems, Anchorage, Alaska, pp. 1-6, May 3-8, 2010.

Weng, J., et al., "Autonomous Mental Development by Robots and Animals," Science, vol. 291, No. 5504, pp. 599-600, Jan. 26, 2001.

\* cited by examiner

<br>

<br>

<br>

<br>

<br>

<br>

<br>

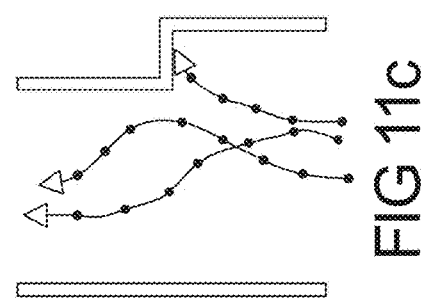
FIG 11a
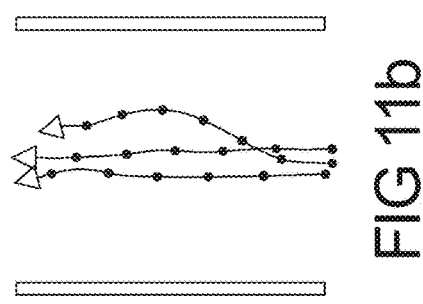
FIG 11b
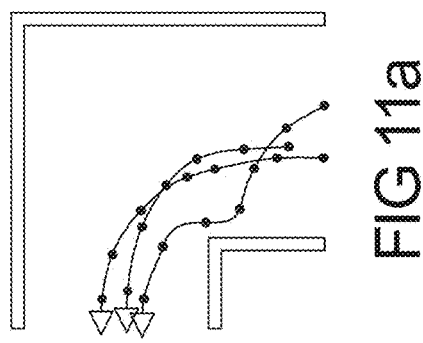
FIG 11c
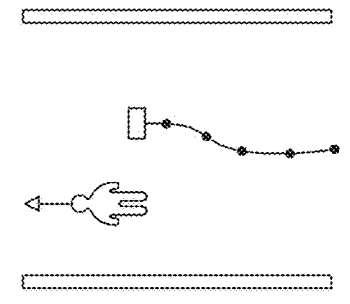
FIG 11d
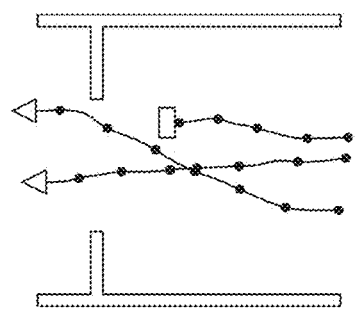
FIG 11e
ACTIONS TAKEN
CART ROUTE AND DIRECTION (CONTINUE MOVING)
CART STOPS

NAVIGATIONAL CONTROL OF ROBOTIC SYSTEMS AND OTHER COMPUTER-IMPLEMENTED PROCESSES USING DEVELOPMENTAL NETWORK WITH TURING MACHINE LEARNING

CROSS-REFERENCE TO RELATED APPLICATIONS

This application claims the benefit of U.S. Provisional Application No. 62/191,092 filed on Jul. 10, 2015.

FIELD

The present disclosure relates generally to robotic control systems and automated object recognition systems. More particularly, the disclosure relates to the control and programming of such robotic control systems and other computer-implemented systems using a computer-implemented developmental network that incorporates a Turing Machine that teaches or programs the developmental network.

BACKGROUND

This section provides background information related to the present disclosure which is not necessarily prior art.

In robotic systems, sensors gather information about the physical environment and effectors perform physical manipulations of that physical environment. For example, a robotic system within a manufacturing plant may use optical sensors, cameras, laser scanning sensors and the like to "see" the physical environment in which the robotic system works. It then performs its assigned task using robotic arms or other effectors to manipulate the physical environment while taking into account the position of the workpiece as well as other obstacles within the physical environment that must be avoided. Similarly, a self-driven automotive vehicle may use similar optical sensors to "see" traffic patterns as they develop, and then use its effectors to control operation of the vehicle movement, by controlling steering, acceleration, braking and the like.

Robotic systems having this degree of sophistication require sophisticated controllers to receive and interpret information gleaned from the robotic sensors and to generate control outputs to cause the effectors to perform precisely the movements and physical manipulations required. If a robotic system is assigned to a simple, repetitive task, the controller can be easily programmed using a sequence of IF-THEN control statements. However, if the robotic system is required to operate more autonomously within a real-world environment where unpredictable elements may be present, then programming the controller becomes much more difficult.

One might assume that a sufficiently sophisticated artificial intelligence program should be able to empower a robot with all of the mental capabilities that a human being enjoys. Yet this remains largely the domain of science fiction. It is one thing to design an artificial intelligence program that can appear to mimic certain human-like responses to stimuli. It is far more difficult to develop an artificial intelligence program that can learn from its environment, to acquire new skills, without requiring a span of years devoted to training. After all, even the human being—which the artificial intelligence program is designed to mimic—takes years to develop the motor skills and judgement to learn to drive a car.

SUMMARY

This section provides a general summary of the disclosure, and is not a comprehensive disclosure of its full scope or all of its features.

The present disclosure describes a new way to provide robotic systems and other computer-implemented systems with the requisite "intelligence" to perform sophisticated tasks autonomously in real-world situations where the environment is unpredictable. At the core of the new robotic controller is a developmental network, comprising a three-layered X-Y-Z neural network that operates in parallel with a Turing Machine specially designed to inject teaching commands that allow the developmental network to be trained rapidly.

While the present disclosure provides a detailed theoretical explanation, drawing analogy to how a human baby learns, the technology is a computer-implemented robotic controller with dual learning mechanisms: it learns from its associated Turing Machine, but also from its environment. Thus in this respect the disclosed controller is indeed different from the human learning mechanism, which does not have a Turing Machine feeding teaching instructions directly into the cortex.

Therefore, according to one aspect, the disclosed technology implements a robotic system having an electronic controller; having at least one sensor coupled to the controller and responding to a physical property within a sensed environment; and having at least one effector coupled to the controller and configured to perform physical manipulation within the sensed environment.

The controller employs a processor and a non-transitory computer-readable memory coupled thereto to implement a neural network comprising a plurality of interconnected neurons organized in said memory to define plural areas, including an X area coupled to communicate data with said at least one sensor, a Y area coupled to communicate data with said X area; and a Z area coupled to communicate data with said Y area and further coupled to said at least one effector.

The processor is further programmed to implement a developmental program that communicates with said Y area to supply teaching instructions to the neural network using a Turing Machine implemented by the processor.

The processor is further programmed to mediate an emergent learning process by which the Y area is trained in response to signals supplied through at least one of said X area and said Z area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
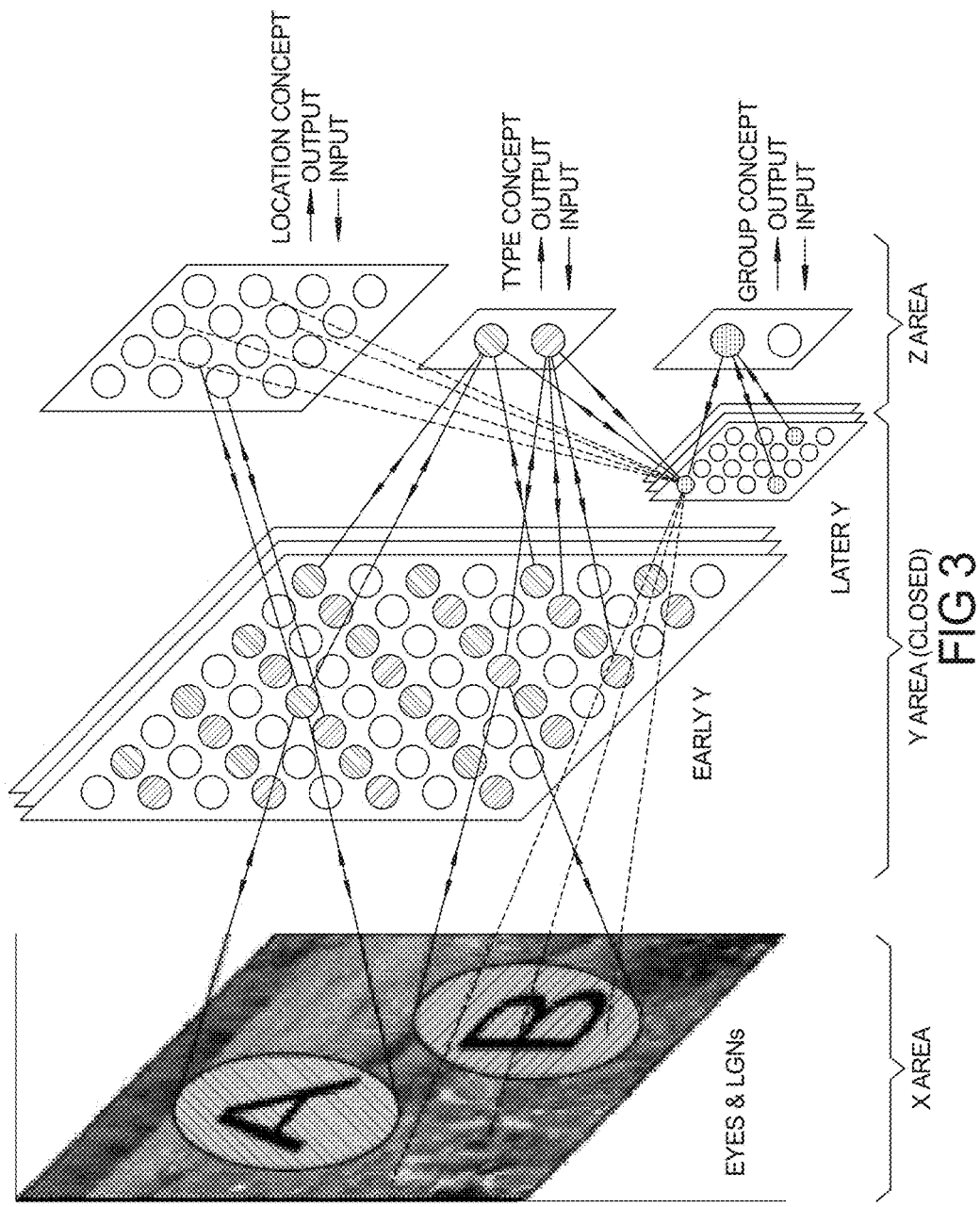
Figure 4:
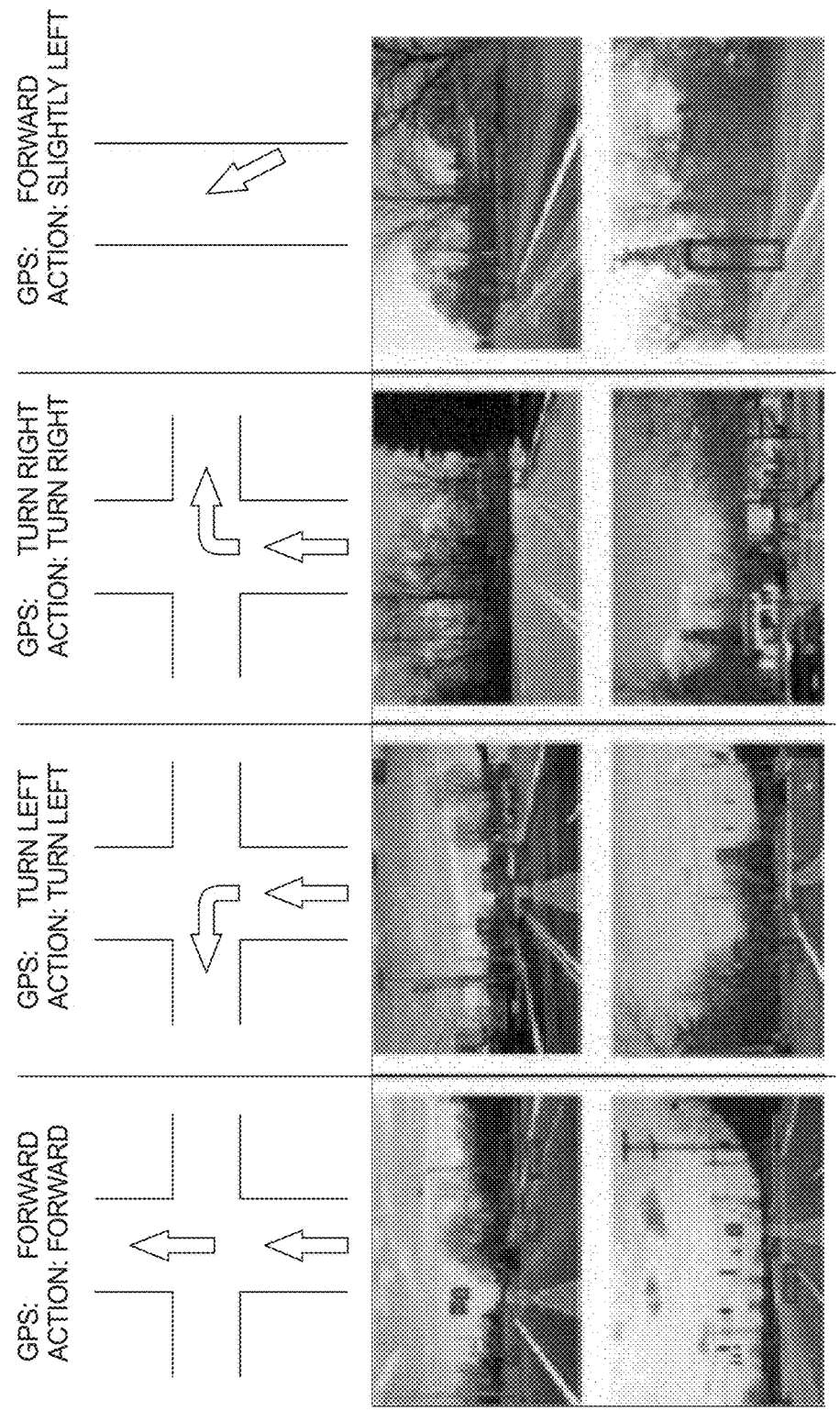
Figure 5:
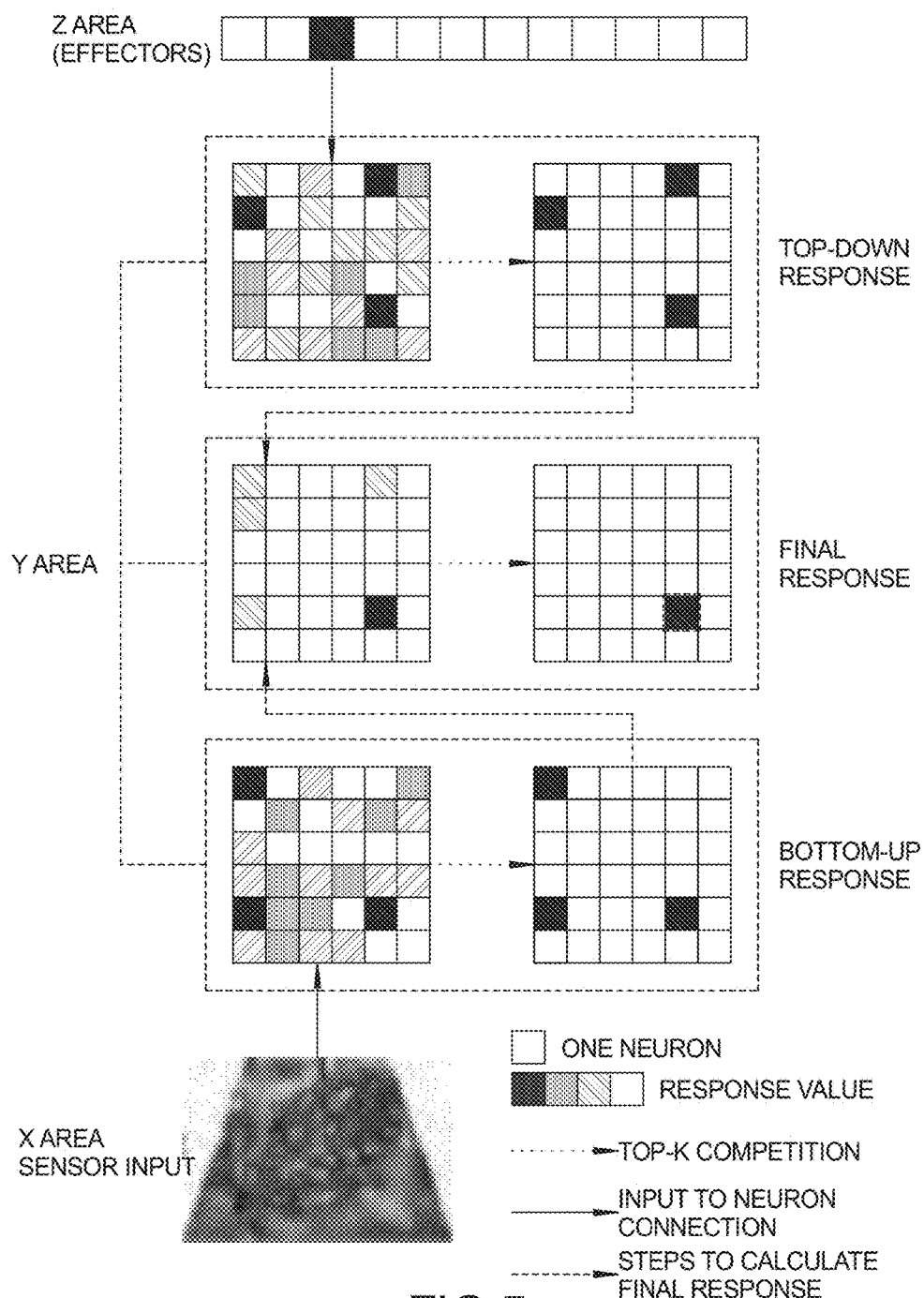
Figure 6:
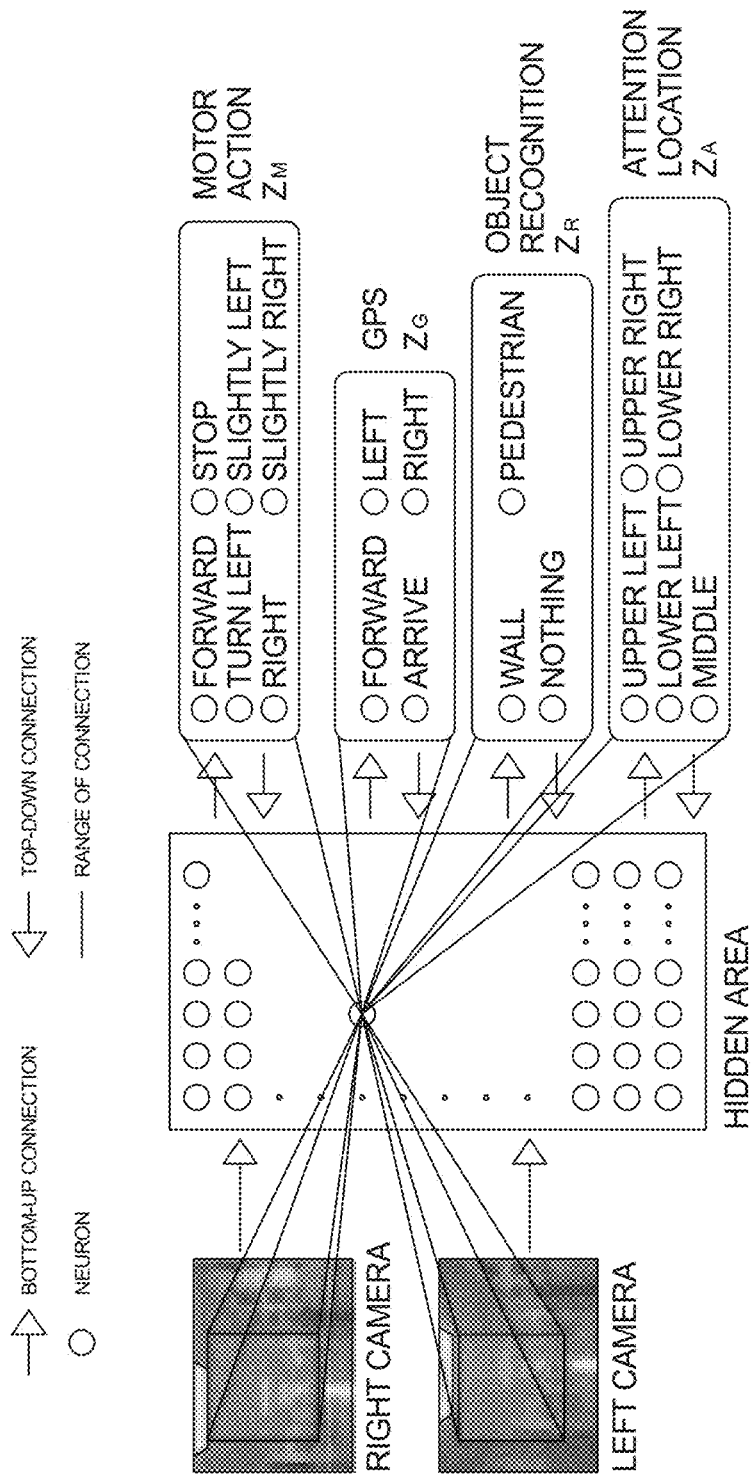
Figure 7:
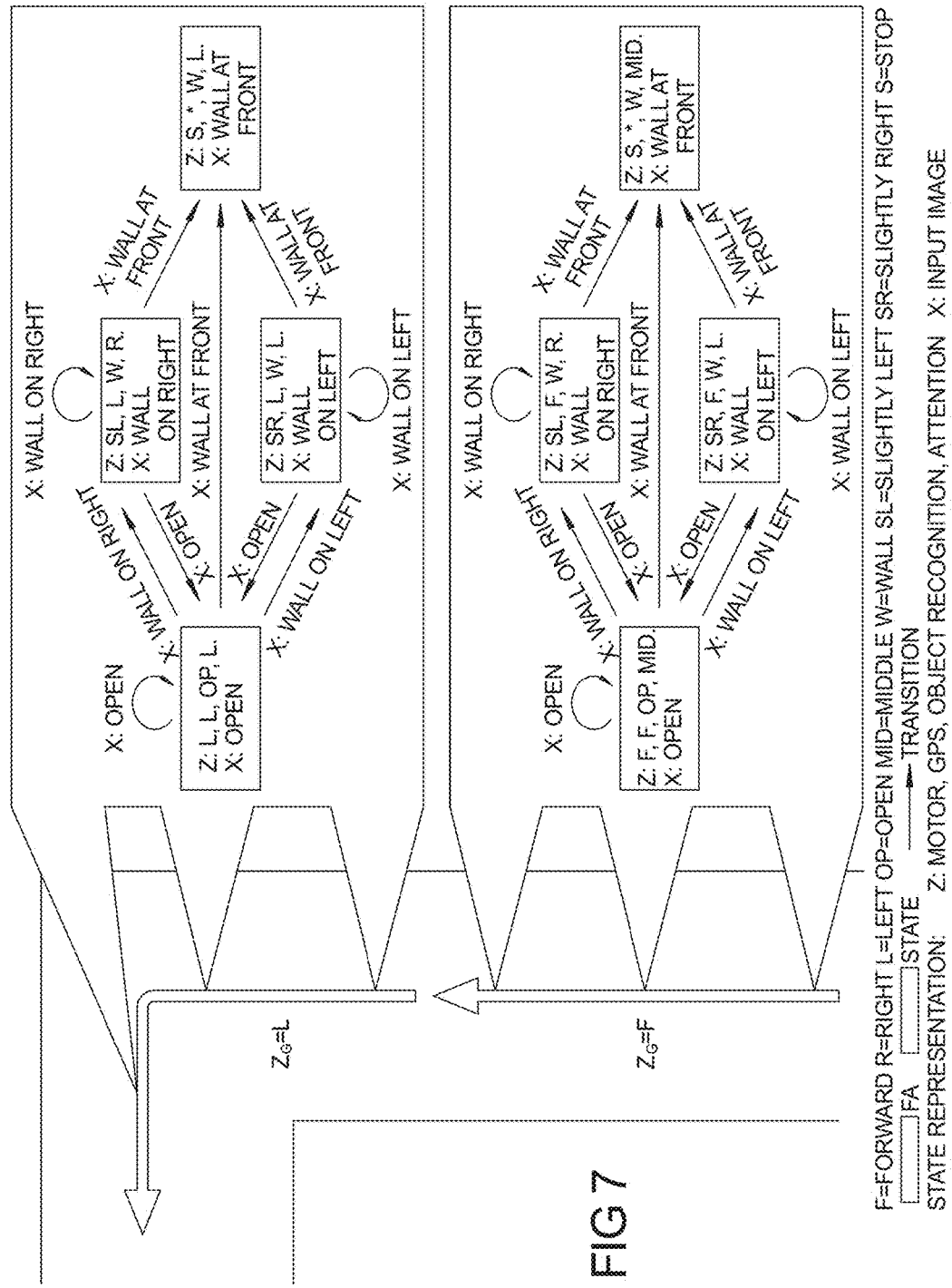
Figure 8:
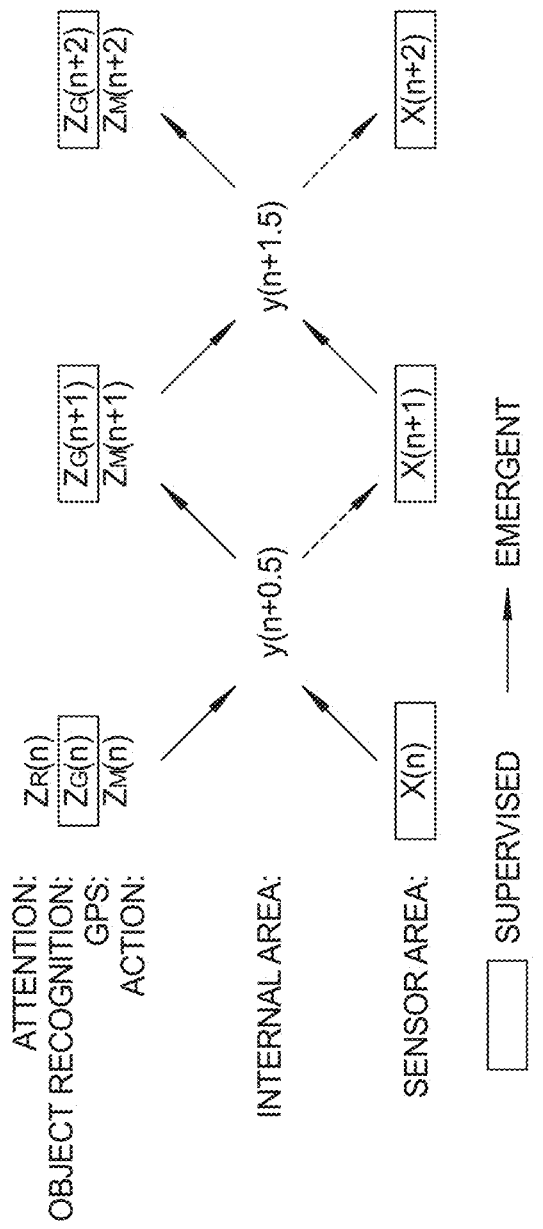
Figure 9:
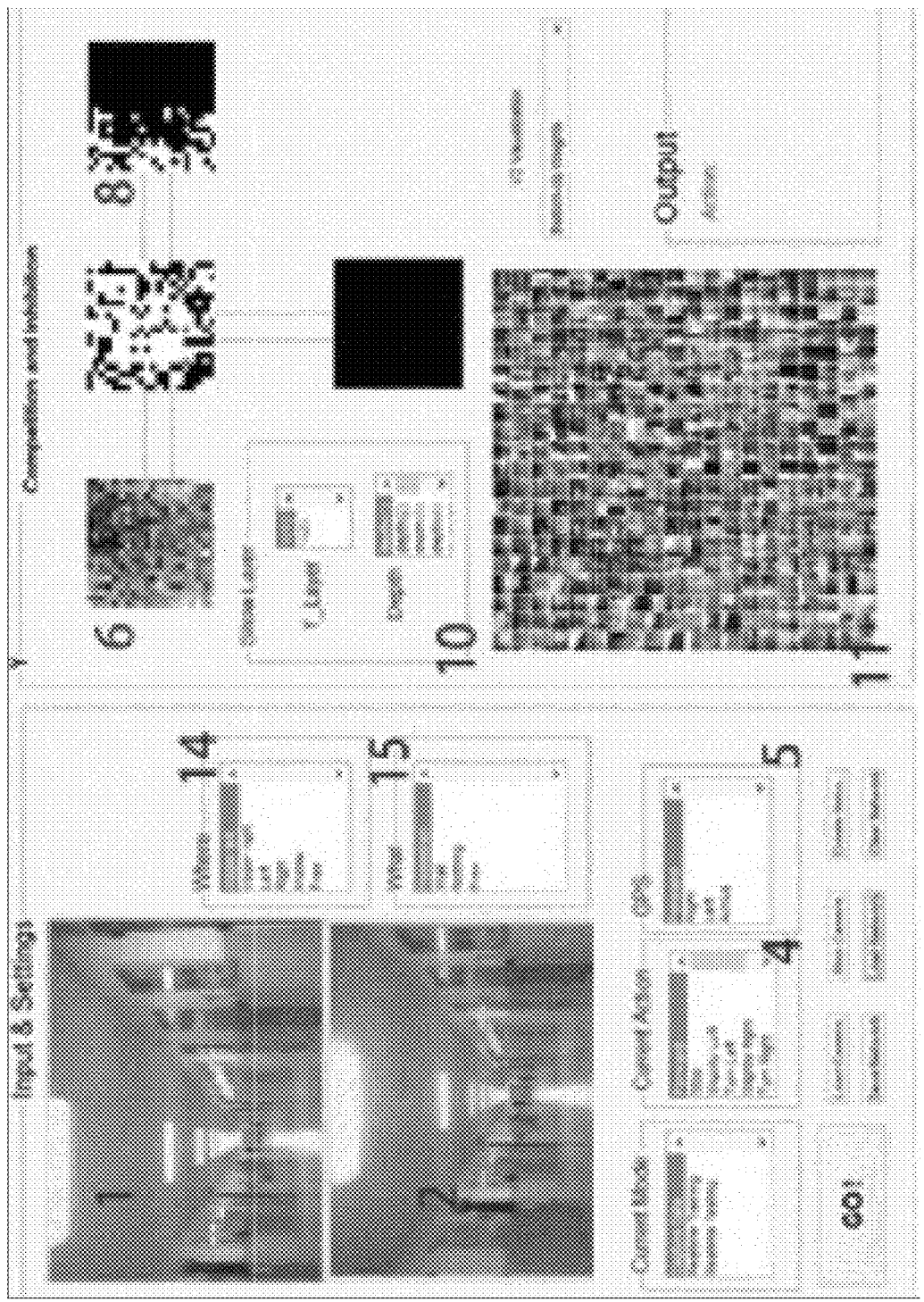
Figure 10E:
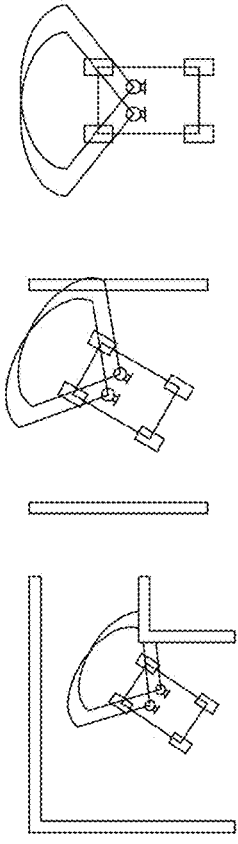
Figure 10D:
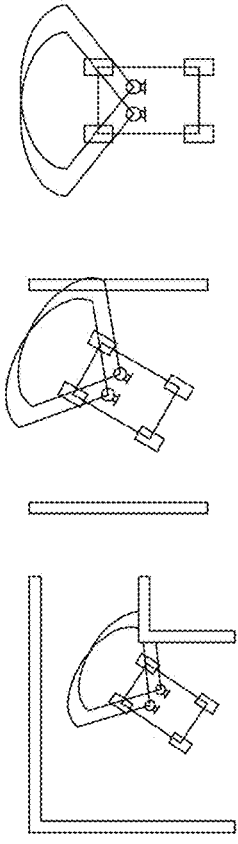
Figure 10C:
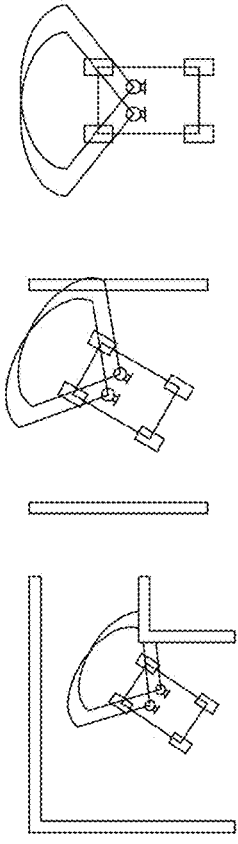
Figure 10B:
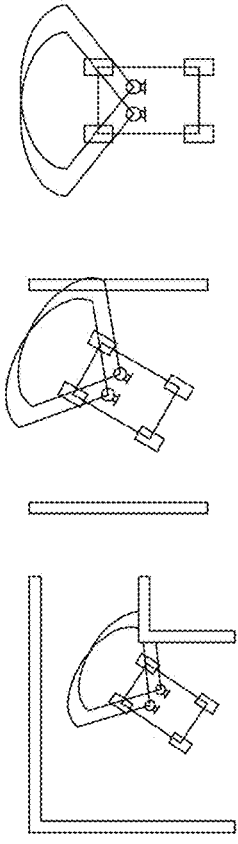
Figure 10A:
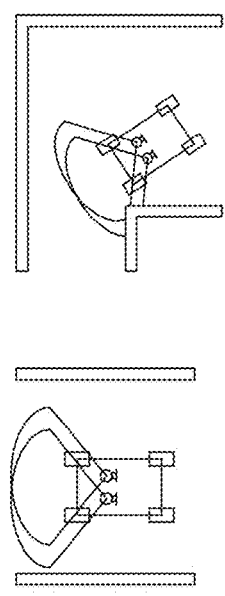
Figure 10I:
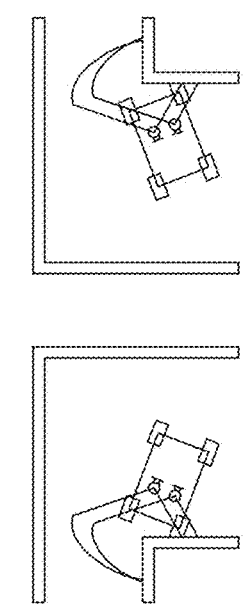
Figure 10H:
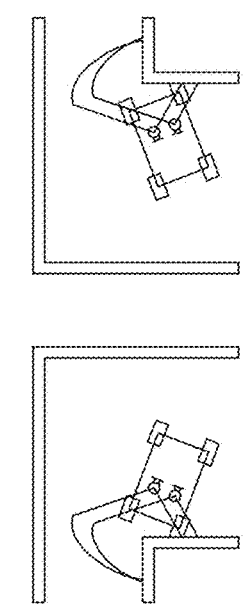
Figure 10G:
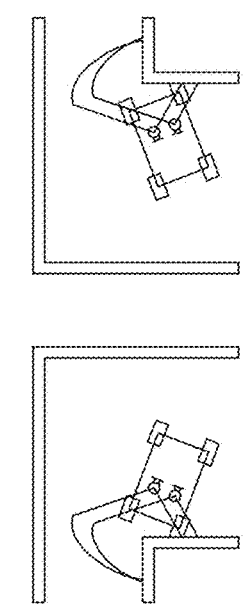
Figure 10F:
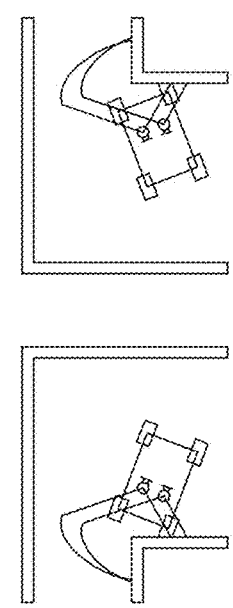
Figure 12:
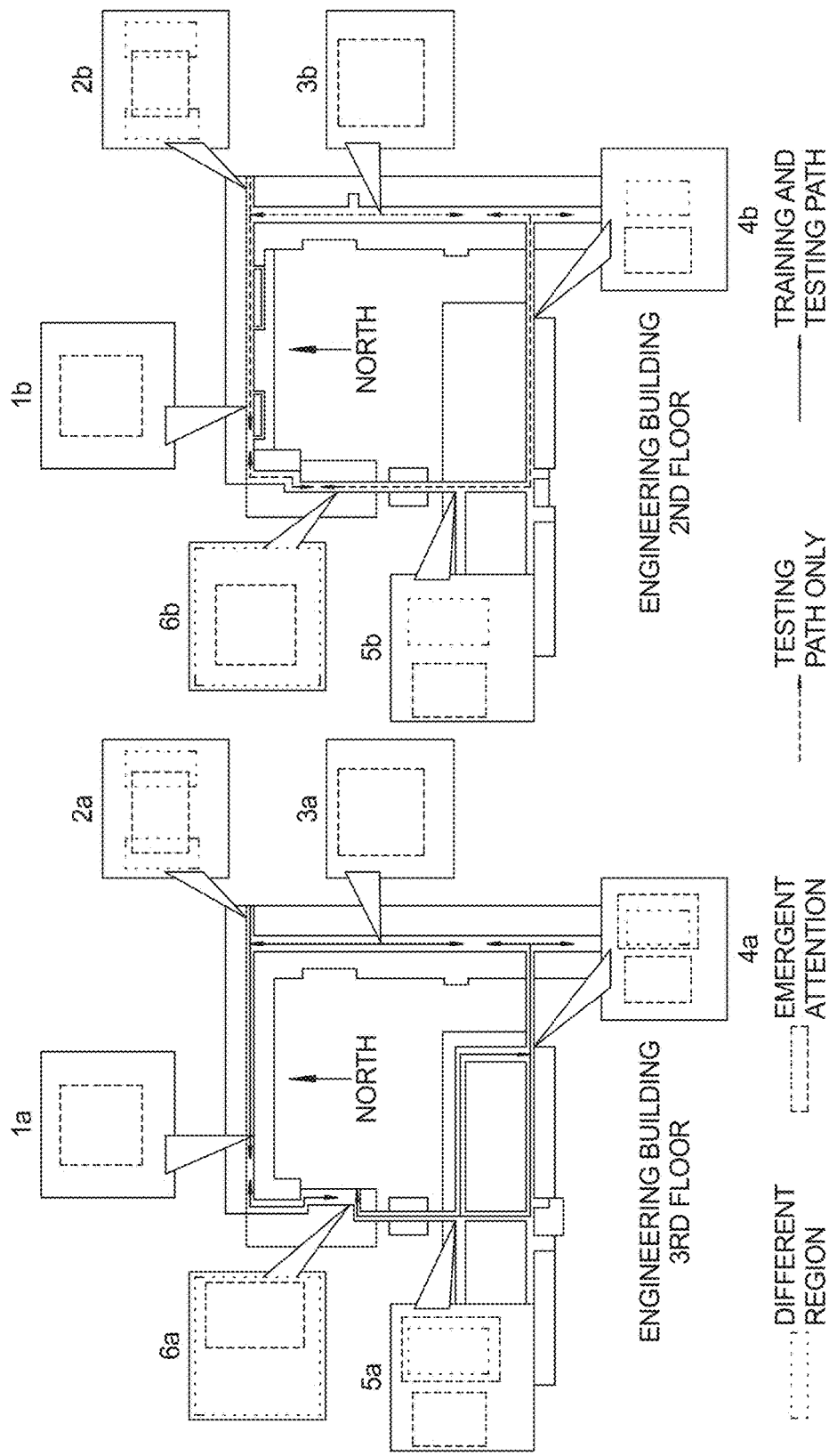

FIGS. 2a-2f comprise a sequence of diagrams illustrating how a generative Developmental Network learns from the physical body and the physical world;

FIG. 3 is a graphical representation of a Developmental Network, showing how the network learns;

FIG. 4 is a collection of outdoor navigation images, useful in understanding the exemplary autonomous navigation embodiment;

FIG. 5 is a chart showing example activation patterns in the Y layer of an exemplary Developmental Network;

FIG. 6 is a graphical representation of an exemplary Developmental Network for an indoor navigation example;

FIG. 7 depicts a partial finite automata for autonomous navigation;

FIG. 8 is a flowchart diagram illustrating the learning and update procedure;

FIG. 9 is a graphical user interface layout of an exemplary real-time training and testing system;

FIGS. 10a-10i are a series of diagrammatic views of different training scenarios faced by the automated robotic agent as it learns in real-time without prior knowledge of the environment;

FIGS. 11a-11e are exemplary route-validation testing diagrams, illustrating how the automated robotic agent moves through the environment;

FIG. 12 depicts an exemplary indoor environment (two building floors); and

Figure 13:
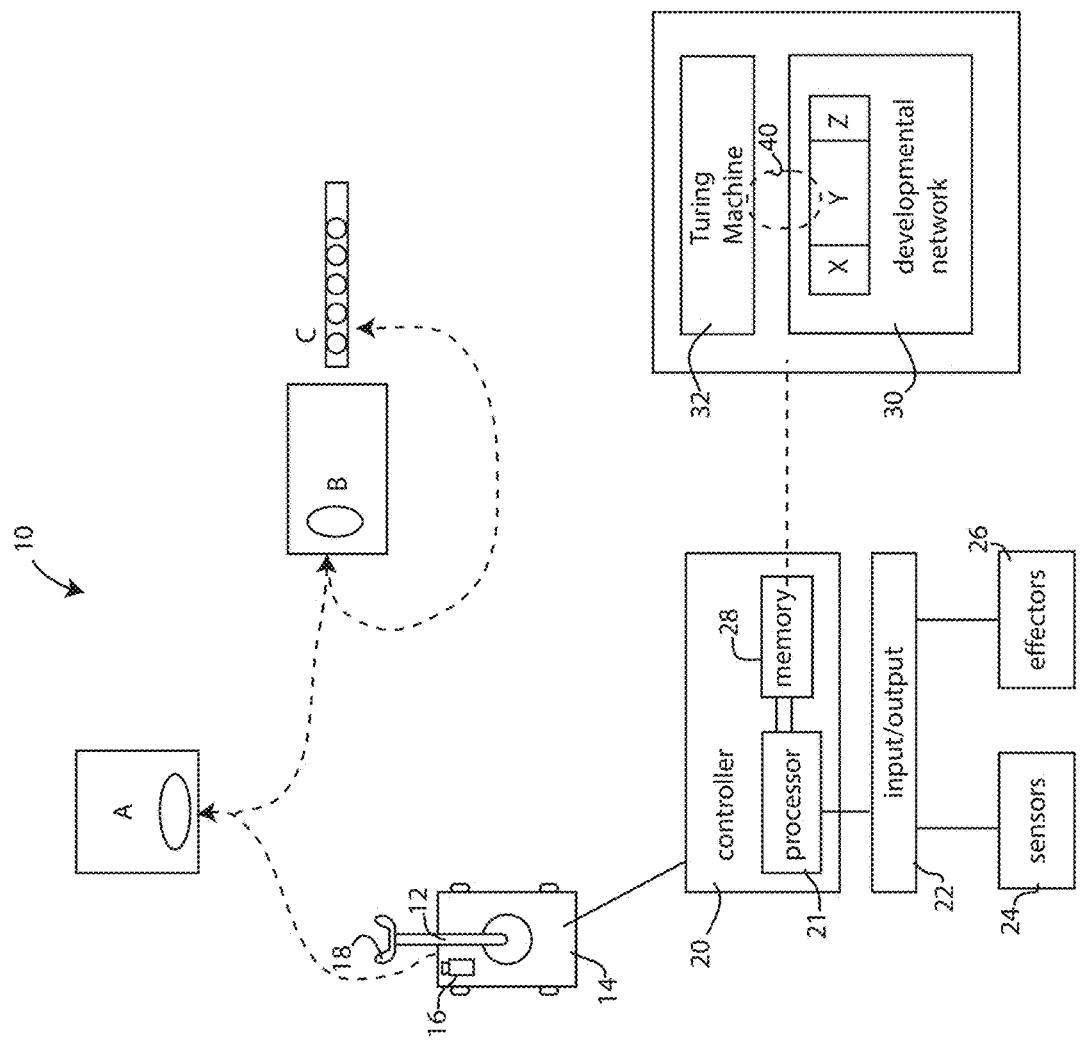

FIG. 13 is a block diagram of a robotic system utilizing as its controller a Developmental Network with Turing Machine learning mechanism.

Corresponding reference numerals indicate corresponding parts throughout the several views of the drawings.

DETAILED DESCRIPTION

Example embodiments will now be described more fully with reference to the accompanying drawings.

Referring to FIG. 13, an exemplary robotic system 10 utilizing the developmental network with Turing Machine learning will first be discussed. As shown, the robotic system has been diagrammatically depicted as having an articulated robotic arm 12 carried on a self-driven car 14 and adapted to visit a collection of different workstation sites A, B and C. It will be understood that this is just one example of a robotic system, and is intended to convey the sense that robotic systems of the future may need to move about within a workplace and may need to make thousands of instantaneous navigational and operational decisions. For diagrammatic illustration purposes, the robot system includes at least one sensor, such as an optical camera system 16 by which the robotic system gains information about its environment, and at least one effector, such as gripper hand 18 by which the robotic system performs physical manipulations to things within the environment.

While physical movement of things within the environment is, of course, envisioned, effectors can be provided to perform other real-world tasks, such as heating and cooling chemical baths, adding reagents to a chemical mixture, entering data into a computer system, and the like.

The robotic system is operated by a self-contained controller, which may be implemented as a special purpose computer system having a specially programmed processor 21 to which the sensors and effectors are coupled for communication. Both hardwired and wireless couplings between the computer system and the sensors and effectors are possible. For illustration purposes, the controller 20 has been separately shown in block diagram form, with an associated bank of input/output ports 22 to which the sensors and effectors attach.

As will be more fully explained, the controller (computer) includes a non-transitory computer-readable memory 28 that is programmed with a special data structure that supports the three-layered (X-Y-Z) developmental network 30 and a specially programmed Turing Machine 32 that operates in parallel with the developmental network and injects teaching instructions directly into the middle layer of the developmental network through a bridge connection, shown diagrammatically at 40.

The developmental network learns from its environment using the inputs received by the attached sensors 24 and also by observing the results achieved by exercising the attached effectors 26. This is the normal way in which a skull-closed neural network learns. The Turing Machine 32, operating in parallel with and in overlapping memory relationship with the developmental network, provides a second way of teaching the neural network. As will be explained, the Turing Machine steps through a series of teaching operations that are injected directly into the middle or X layer of the developmental network. The Turing Machine thus causes the neural network of the developmental network to learn by direct manipulation of the middle layer neurons. These middle layer neurons are otherwise contained within the "closed skull" of the developmental network and are thus not directly accessible by the sensors or effectors.

To appreciate how the marriage of the developmental network and the Turing Machine works, we shall digress briefly to give a theoretical explanation of the computational theory. It is convenient to discuss the theory by drawing analogy to the human brain. Yet those of skill in the art will appreciate that this is just an analogy to aid in understanding of the computer science involved. The robotic system controller, with its combination of three-layered developmental network and Turing Machine, remains an electronically programmed machine. It is no more a brain in the human sense than the human brain is a Turing Machine.

Computational Theory

Our computational theory of brain and mind includes two major parts rooted in the rich literature about biological brains: (A) dynamically emerging, motivation-free circuits and functions, and (B) motivation based on such circuits and functions. The computation in the former (A) is carried out by target-precise, neuron-to-neuron signal transmissions. The computation in the latter (B) is based on target-imprecise diffusion of neural transmitters that diffuse across brain tissue. We focus here on computation of the former (A) type.

All computational networks fall into two categories, Symbolic Networks and Emergent Networks. Symbolic Networks use symbolic representations, whereas Emergent Networks use emergent representations. One type of Symbolic Network is the Finite Automata (FA). In order to explain the theory behind the disclosed concepts, we shall use the Finite Automata as an example. It will be understood that other types of Symbolic Networks also apply. These include Markov Chains, Markov Models, Hidden Markov Models (HMM), Partially Observable Markov Decision Processes (POMDP), Belief Networks, Graphical Models, and all other networks that use at least some symbolic representations.

Figure 1A:
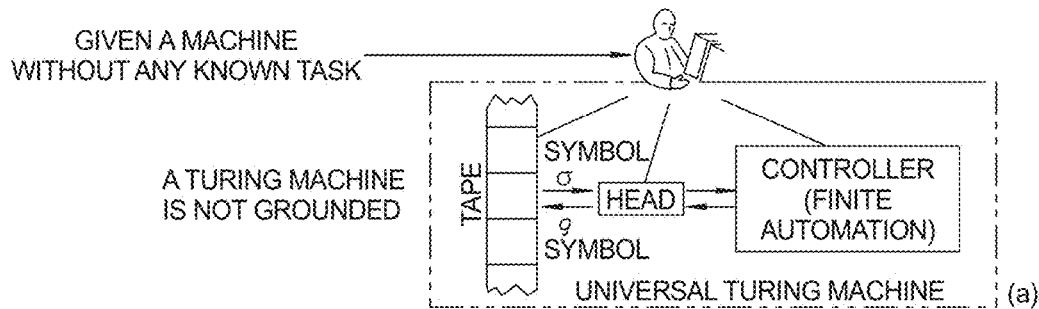
FIG. 1a is a block diagram depicting the concepts of a universal Turing Machine.
Figure 1B:
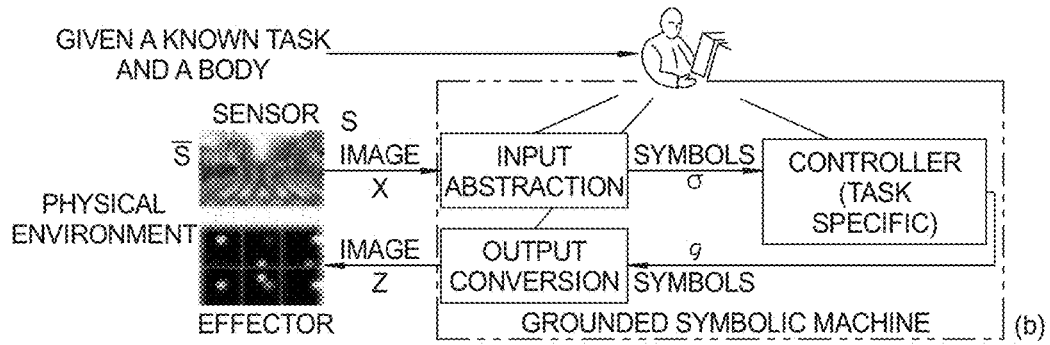
FIG. 1b is a block diagram depicting the concepts of a grounded symbolic machine.
Figure 1C:
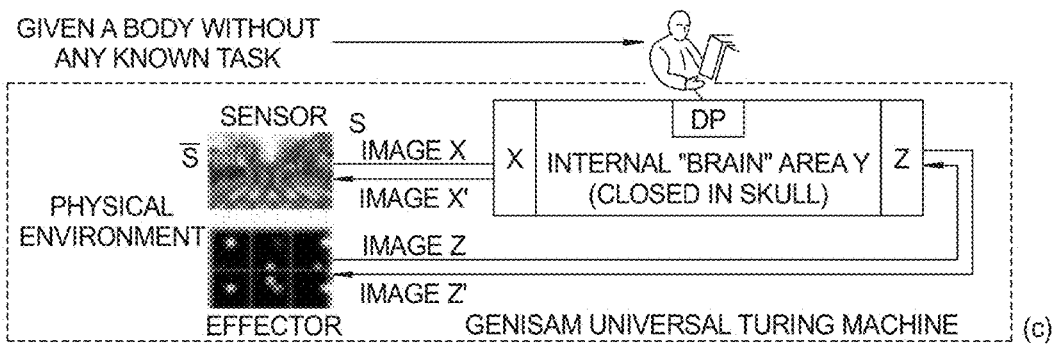
FIG. 1c is a block diagram depicting the concepts of the special purpose (GENISAM) universal Turing Machine used in the present robotic controller.
Figure 2A:
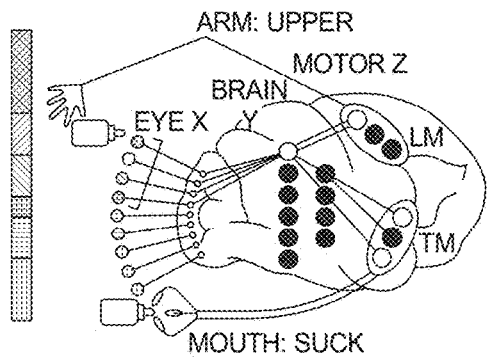
Figure 2B:
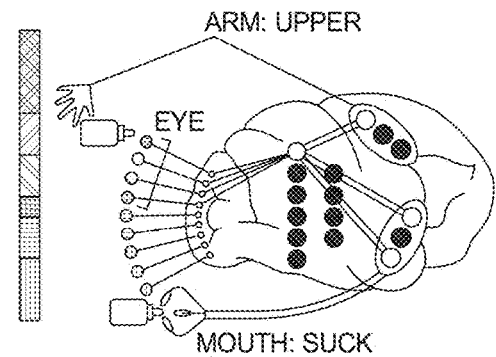
Figure 2C:
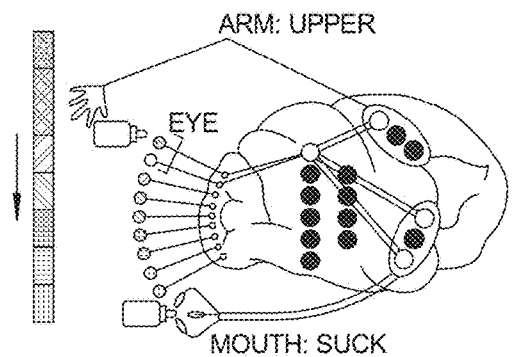
Figure 2D:
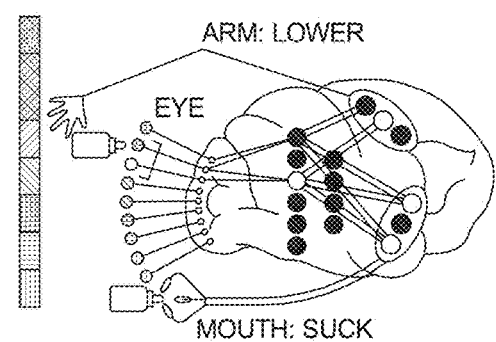
Figure 2E:
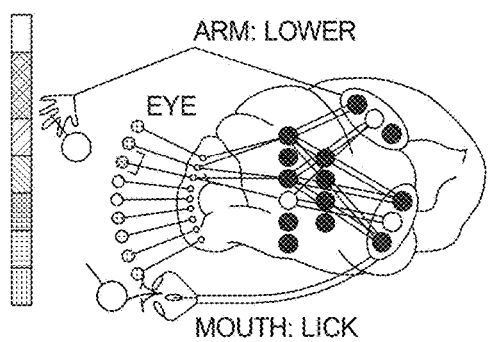
Figure 2F:
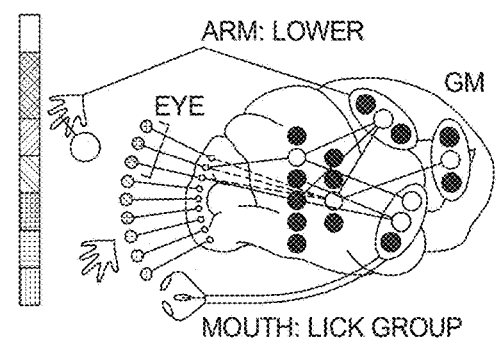

The class of Emergent Network includes all neural networks that use exclusively emergent representations, such as Feedforward Networks, Hopfield Networks, Boltzmann Machines, Restricted Boltzmann Machines, Liquid State Machines, Reservoir Computing, and the newer Developmental Networks (DNs). However, traditional neural networks are not as powerful and complete as Developmental Networks, because they do not have the logic of Finite Automata. The major differences between a Symbolic Network (SN) and a Developmental Network (DN) are illustrated in FIGS. 1a-1c.

Turing Machines and Developmental Networks

In the classical sense, as originally conceived by Alan Turing in 1936, a Turing Machine is a hypothetical device that manipulates symbols on a strip of tape according to a table of rules. Despite its simplicity, a Turing machine can be adapted to simulate the logic of any computer algorithm, and is particularly useful in explaining the functions of a CPU inside a computer. While purely theoretical in 1936, today it is possible to implement a Turing Machine, using the processor of a computer as the controller and using computer-readable memory as the tape. In this regard is also possible to use a computer-implemented neural network to simulate a Turning Machine.

In the disclosed system, an Emergent Turing Machine serves as a foundational component that can be used to teach a Developmental Network, which is a form of neural network. For more information on Developmental Networks, reference may be had to U.S. Pat. No. 8,694,449, "Neuromorphic spatiotemporal where-what machines," the specification and drawings of which are hereby incorporated by reference.

A Turing Machine (TM) has a controller and a tape, as illustrated in FIG. 1(a). It is for a specific and known task. By known we mean its human programmer knew before he finishes the programming. The term unknown below means the opposite.

If a human programs a Turing Machine in such a way that the Turing Machine treats the tape to have a set of rules (i.e., a computer program) for the controller and a set of data (e.g., text words) that the rules apply to, the Turing Machine is called a Universal Turing Machine. It is universal—for general purposes—because the human programmer of the Universal Turing Machine does not know the tasks that many later programs on the tape will perform. However, a Universal Turing Machine does not automatically program itself for general purposes because it is another human who programs each program on its tape.

Agents and GENISAM Properties

An agent is something that senses and acts on its environment. The environment of a Turing Machine is its tape (which can be implemented using computer-readable memory). To automatically program for general purpose in the world, the agent must sense and act on the real physical world (i.e., it must be grounded) so that it can learn original rules of the world.

TABLE 1

Different Types of Machines

| Type of Machines | TM | Universal TM | Grounded Symbolic Machine | Prior Neural Network | GENISAM TM |
|---|---|---|---|---|---|
| Unknown Tasks | No | Yes | No | No (Episodic) | Yes |
| General purpose | No | Yes | No | No | Yes |
| Grounded | No | No | Yes | Yes | Yes |
| Automatically program | No | No | No | No | Yes |

Many prior systems are grounded but they are for known tasks only. A neural network can do a set of known tasks. A human-programmed Von Neumann computer can do some other known tasks. They belong to the class of Grounded Symbolic Machines illustrated in FIG. 1(b)—grounded but for known tasks.

Convolutional Deep Neural Networks are more flexible because they automatically adapt internal representations (i.e., weights) for global pattern classification or episodic tasks. They do not automatically program for general purposes. See Table 1 for a summary.

Motivated by automatic programming for general purposes, from "infancy" to "adulthood", the following seven properties in the acronym GENISAM seem to be necessary.

Grounded: To learn physical facts, directly sense, and directly act on, the physical world. Emergent: Simpler firing patterns of neurons enable more complex representations to emerge.

Natural: Encoding must be natural from sensors and effectors without handcrafted special encoding.

Incremental: Update using one input pattern at a time and discard the input before the next arrives.

Skulled: The skull closes the brain, not allowing hand-tweaking brain parameters after the "birth".

Attentive: For every cluttered scene, attend to only components that the temporal context requires.

Motivated: Avoid pain and seek pleasure to speed up learning important events. Automatically establish and update connections, e.g., cut off background pixels for object segmentation in FIG. 2(c) and connect only to abstract concepts for higher concepts in FIG. 2(f).

We can use a compiled recurrent network N to compute a Turing Machine computable and statically-given function f. A network with external memory can perform simple algorithms such as copy, sort, and associate recall from input and output examples. One may regard an attention process as to read from and write to one of disjoint memory cells selectively (i.e., one of n elements), but we regard that the attention process must also attend to a set of patches of any shape and a limited number from a cluttered natural scene (i.e., any subset from a set of pixels).

Below we explain that the controller of any Turing Machine—regular Turing Machine and Universal Turing Machine—is equivalent to a Finite Automaton. Thus, grounded learning of any Finite Automaton using the GENISAM Turing Machine is for general purposes. A Finite Automaton has two sets of symbols, the input set and the state set. Each symbol may have very rich meanings, such concepts, rules, goals, etc. The automatic procedure for learning the transitions in the GENISAM Turing Machine does not need to "know" such meanings because the automatic procedure that looks up the transition table of a Finite Automaton does not need to.

We report experiments of "baby"-like automatic programming by the GENISAM Turing Machine in Developmental Networks. All the experiments are for spatiotemporal rules, one GENISAM Turing Machine for each experiment. The hand-picked parameters are only computational resources (the numbers of pixels, muscles, and feature neurons).

(1) Visual Concept Hierarchy.

A "baby" automatically learns invariant concepts, type-invariant "where" and location-invariant "what", that are physical world constraints. His arm "tells" where the object (bottle vs. candy) is and his mouth's use of the object (suck vs. lick) "supervises" what the object is, as illustrated in FIGS. 2a-2f. When he has learned two objects (e.g., candy and hand), he learns object group built on the learned type concepts only. The GENISAM Turing Machine automatically forms concept hierarchy as rules (e.g., group rules on objects; object rules on image patches in cluttered scenes).

(2) Stereopsis.

The left and right images correspond to multiple sensory sources and the GENISAM Turing Machine automatically programs multi-source rules. Unlike traditional engineering methods, there is no need to open the "skull" to handcraft the feature of left-right match.

Visual navigation in the "Autonomous navigation as an example prototype" section below is an example of the domains of applications.

Methods

We model a brain as the controller of a Turing Machine and the physical world of the brain as a generalization of the tape of the Turing Machine as shown in FIGS. 1(a) and (c). The controller of a Turing Machine is superficially more complex than a (deterministic) Finite Automaton since it also outputs actions—move the head, write a symbol to the tape, or halt the Turing Machine.

The Controller of the Turing Machine is a Finite Automaton

We generalize a Finite Automaton into an agent: It outputs the current state q as action. Furthermore, we let state q also include the current action (write to tape) of the TM. Then, the general form of a transition of the TM is as follows: From the current state q and the current tape input $\sigma$, the transition function $\delta$ of TM uniquely gives the next state q' as q'=$\delta$(q, $\sigma$), or graphically:

$$\begin{bmatrix} q \\ \sigma \end{bmatrix} \to \begin{bmatrix} q' \\ \sigma' \end{bmatrix} \quad (1)$$

where $\sigma'$ is the next tape input probably affected by the agent's past actions through real-world physics. This is exactly the transition function of a Finite Automaton. Thus, the controller $\delta$ of a Turing Machine is a Finite Automaton. That is, a Turing Machine is a Finite Automaton "living" on the tape.

FIG. 3 gives an example about how the state of the Finite Automaton, as a controller of the Turing Machine, is formed in the Z area which consists of a few Z subareas.

A Universal Turing Machine is for general purposes because in the above expression, input a read from the tape can be either from a rule (i.e., from the program on tape) or a datum (i.e., from the data on tape). But the framework above is universal for both. More generally, the rule can represent any meaning in the program, e.g., task name, goal, subgoal, rule, etc. Such meanings "hide" inside the symbols q and $\sigma$.

For example, $q_0$ means the "empty" state and $\sigma_0$ means "I". With this pair ($q_0$, $\sigma_0$) the next state $q_1$ should be "I" to memorize input "I". The input next $\sigma_1$ is "am". With the pair ($q_1$, $\sigma_1$), the next state $q_2$ is "I am", to memorize the longer context. The next input $\sigma_2$ is "fine". With this pair ($q_2$, $\sigma_2$), the next state $q_3$ is "I am fine". This short sequence is shown below.

$$\begin{bmatrix} q_0 \\ \sigma_0 \end{bmatrix} \to \begin{bmatrix} q_1 \\ \sigma_1 \end{bmatrix} \to \begin{bmatrix} q_2 \\ \sigma_2 \end{bmatrix} \to \begin{bmatrix} q_3 \\ \sigma_3 \end{bmatrix} \to \ldots \quad (2)$$

In the Developmental Network, each symbol will be a neuronal firing pattern like 11010 so it does not need a human to define a static symbol for every static meaning like "I", "I am" or "I am fine".

Obviously, the Developmental Network will likely not have sufficient neurons to memorize all such short and long partial sentences. Only stated patterns that occur most often are represented. Long contexts typically do not appear as often, except for a few. We will now discuss two cases, learn from a Turing Machine and learn from the physical world. The former is useful to understand the logic completeness of the Developmental Network that an adult is capable of. The latter enables us to understand how a child can learn without a human teacher.

Learn from a Teacher Turing Machine

First, consider how the Developmental Network learns from a teacher Turing Machine, which is either a regular Turing Machine or Universal Turing Machine. We explain that the Developmental Network can learn from the Turing Machine perfectly, incrementally, but learning one transition at a time.

Both the teacher Turing Machine and Developmental Network live in parallel, sampled at discrete times $t=t_0$, $t_1$, . . . , as illustrated in Table 2. Each pair of consecutive times is separated by a constant unit (e.g., 1 ms to 10 ms). We discuss how the Developmental Network learns from the Turing Machine.

TABLE 2

The DN Learns from a Teacher Universal Turing Machine $$\begin{bmatrix} q(t_0) \\ \sigma(t_0) \end{bmatrix} \to \to \to \begin{bmatrix} q(t_2) \\ \sigma(t_2) \end{bmatrix} \to \to \to \begin{bmatrix} q(t_4) \\ \sigma(t_4) \end{bmatrix} \to \ldots$$

$$\begin{bmatrix} Z(t_0) \\ X(t_0) \end{bmatrix} \to Y(t_1) \to \begin{bmatrix} Z(t_2) \\ X(t_2) \end{bmatrix} \to Y(t_3) \to \begin{bmatrix} Z(t_4) \\ X(t_4) \end{bmatrix} \to \ldots$$

$$Y(t_0) \to \begin{bmatrix} Z(t_1) \\ X(t_1) \end{bmatrix} \to Y(t_2) \to \begin{bmatrix} Z(t_3) \\ X(t_3) \end{bmatrix} \to Y(t_4) \to \ldots$$

Let the symbolic state-input pair at time t be denoted as (q(t), $\sigma$(t)). The first row in the table shows the display of the teacher Turing Machine over time.

The emergent firing pattern of the state-input pair at time t is denoted as (Z(t), X(t)), corresponding to (q(t), $\sigma$(t)). The second row in Table 2 shows the corresponding patterns vertically aligned with the teacher Turing Machine at discrete times. These discrete times may be mediated using a predetermined clock cycle.

In each unit time, the entire Developmental Network updates once, meaning that all neurons in each area of X, Y, and Z compute once. Y at time $t_1$ finishes its computation as result Y ($t_1$) using (Z ($t_0$), X ($t_0$)) as input. Next, Z at $t_2$ processes input from Y ($t_1$). Thus, it takes two Developmental Network updates for the firing pattern in X to go through Y and reach Z. The Developmental Network updates twice for each transition of the teacher Turing Machine.

While the area Y computes in parallel with X and Z, there is another parallel temporal flow as shown in the third row of the table. Although the second flow increases the temporal resolution in the real world, for learning from the Turing Machine we let it repeat the upper flow, e.g., Z ($t_1$)=Z ($t_0$) and X ($t_1$)=X ($t_0$), then we have Y ($t_2$)=Y ($t_1$), and so on.

When Developmental Network learns from the teacher Turing Machine, the Z area is supervised by the Turing Machine. When the Turing Machine leaves the Z area free, the Developmental Network predicts the Z response. Likewise, DN also predicts the firing pattern in X. But LM is not designed to predict X, the Developmental Network cannot predict X well. This does not matter, as X is always supervised by input σ.

Because the pattern (Z, X) from the Turing Machine is complete, error-free, without any background components as "noise", learning from the Turing Machine is always perfect and error-free as long as the number of Y neurons is at least the number of transitions in the Turing Machine, because learning from the Turing Machine is a special case of learning from the physical world, discussed below.

Learn From the Physical World

Next, consider how the Developmental Network learns from the physical world.

Consider FIGS. 2a-2f where the setting has a cluttered scene. The eye has receptors whose colors correspond to the projection from the scene, which contains an object and a multi-object background. The Location Motor area controls the arm. The Type Motor area controls the mouth. The following discussion (a) to (e) refers to FIGS. 2(a) to (e), respectively. In this example, the Developmental Network learns three concepts, location, type, and group, as Z patterns, also as its emergent states. But the state in Z can represent any spatio-temporal contexts, as discussed above.

(a) While the arm holds the bottle, the Location Motor firing pattern (3 neurons in the blue area) tells the location. While the mouth sucks, the Type Motor firing pattern (3 neurons in the brown area) gives the type. The two patterns together (6 neurons) give state Z. Such early actions can be generated by inborn reflexes or from parent's holding. At time t1, a Y neuron y1 (1st in the 1st Y layer) records the state-input pair (Z, r(X)) where r(X) donates a limited receptive field on the retina X (4 pixels).

(b) At the next time t2, all the firing neurons in Location Motor (1 neuron) and Type Motor neurons (2 neurons) add links from the y1 neuron.

(c) The background part behind the bottle moves down. Every neuron in the Developmental Network performs synapse maintenance: If some pre-synaptic signals match badly with the corresponding synaptic weight values, the corresponding synaptic spines retract, causing the "bracket" to shrink from 4 synapses down to 2 synapses. Thus, the y1 neuron automatically cuts background pixels from the foreground bottle—automatic segmentation from a cluttered scene.

(d) The bottle moves down. The type pattern in Location Motor does not change, but the location pattern in Location Motor changes. The Y neuron y3 (3rd, first area) happens to be the winner neuron. Linked from the firing 3rd Y neuron, the type pattern in Type Motor becomes location invariant, as the firing Type Motor neurons connect from both y1 and y3 neurons. The more the bottle moves, the more locational invariant the firing Type Motor neurons are.

(e) Change to object candy. Similar to (d), but the type changes. The Type Motor type means action "lick". The firing neurons in Location Motor become type invariant (for bottle and candy).

(f) Higher relation concept. Another Group Motor area, represented by action "lick group". Synapse maintenance in the 3rd Y neuron in the 2nd Y layer automatically cut links from X and 1st Y layer. Group Motor is more abstract for group is based on location and type.

As the patterns from the teacher Turing Machine are consistent with those from the real world, the skills learned from both sources are consistent. Learning from the physical world is like self-taught, while learning from a teacher Turing Machine is like learning in a school.

The Developmental Network learns for general purposes because it can learn each transition in the table, instantly and error-free, from any complex Universal Turing Machine which is for general purposes. The Developmental Network further automatically programs for general purposes, as it automatically and incrementally learns from the physical world or a teacher Turing Machine. At each time instance, the firing neurons in each area of X, Y, and Z only change slightly because of the update as incremental average, but the competitions in each area and subarea greatly change the corresponding network logic and behaviors (e.g., because of the winner and loser changes).

Unlike a Turing Machine, the number of patterns in (Z, X) in the real world are unbounded, the GENISAM Developmental Network incrementally and optimally interpolates the observed space of (Z, X) using the limited number of Y neurons and the limited learning experience up to every discrete update time, as formally proved. The pain and sweet signals bias the weights of the corresponding events in each area of X, Y and Z, so that predictions enable pain-avoidance and pleasure-seeking.

Universal Turing Machines

The Turing Machine model is powerful because it shows that one can construct a Universal Turing Machine $T_u$ (general-purpose computer) that simulates any human hand-crafted Turing Machine (a task-specific program), $T_1$ on data x (any data for the program $T_1$). The tape of $T_u$ is like a computer memory that stores the program ($T_1$), the input data x for $T_1$ to process, and the output from the processing. $T_1$ is for executing one of many open-ended tasks.

Algorithm

The small Developmental Program (DP) self-programs logic of the world into a huge Developmental Network based on experiences in its physical activities. A Developmental Network has its area Y as a "bridge" for its two banks, X and Z, as illustrated in FIG. 3.

Biologically, a Developmental Program algorithm models the collective effects of some genome properties of the cells of the nervous system—neurons and other types of cells in the nervous system. Thus, in nature, the Developmental Program is a result of evolution across many generations of a species. The Developmental Program seems to be a more systematic way to understand natural intelligence than studies of the response of a child or adult brain.

In artificial intelligence, a Developmental Program algorithm is the result of human understanding of the development of natural intelligence followed by a human Developmental Program design based on such understanding. This approach, known as developmental approach, short-cuts the long and expensive process of cross-generation evolution.

Some parameters of the Developmental Program (e.g., the number of cells in Y) could be experimentally selected by a genetic algorithm, but the Developmental Program as a whole seems to be extremely expensive for any artificial genetic algorithm to reach without handcrafting (e.g., see the handcrafted area function below).

Human design of the Developmental Program algorithm seems to be a more practical way to reach human-like mental capabilities and human-level performance in robots and computers for two main reasons: (1) Fully automatic development of intelligence (i.e., task-nonspecific and fully automatic learning) is the approach that the natural intelligence takes and has demonstrated success. (2) The design of the DP algorithm is a clean task, in contrast to traditional Artificial Intelligence—modeling intelligence itself—which is a muddy task.

The quality in a human-designed Developmental Program, when the Developmental Program is widely used in the future, greatly affects all the capabilities in the developmental robots and computers that use the Developmental Program.

In the Developmental Network, if Y is meant for modeling the entire brain, X consists of all receptors and Z consists of all effectors—muscle neurons and glands. Additionally, the Y area of the DP can also model any Brodmann area in the brain and, if so, the X and Z correspond to, respectively, the bottom-up areas and top-down areas of the Brodmann area. From the analysis below, we can also see that the Y area of the Developmental Network can model any closely related set of neurons—Brodmann area, a subset, or a superset.

The most basic function of an area Y seems to be prediction—predict the signals in its two vast banks X and Z through space and time.

Algorithm 1 (DP) Input areas: X and Z. Output areas: X and Z. The dimension and representation of X and Y areas are hand designed based on the sensors and effectors of the species (or from evolution in biology). Y is the skull-closed (inside the brain), not directly accessible by the outside.

1. At time t=0, for each area A in {X, Y, Z}, initialize its adaptive part N=(V, G) and the response vector r, where V contains all the synaptic weight vectors and G stores all the neuronal ages. For example, use the generative DN method discussed below.

2. At time t=1, 2, . . . , for each A in {X, Y, Z} repeat:
  (a) Every area A performs mitosis-equivalent if it is needed, using its bottom-up and top-down inputs b and t, respectively.
  (b) Every area A computes its area function f, described below, $$(r', N') = f(b, t, N)$$

where r' is its response vector and N and N' are the adaptive part of the area defined above, before and after the area update, respectively. Note that r is not part of the domain of f because f is the model for any area A, not just for an individual neuron of A. Thus, f does not use iterations, efficiently approximating lateral inhibitions and internal excitations.
  (c) For every area A in {X, Y, Z}, A replaces: N←N' and r←r'.

The Developmental Network must update at least twice for the effects of each new signal pattern in X and Z, respectively, to go through one update in Y and then one update in Z to appear in X and Z.

In the remaining discussion, we assume that Y models the entire brain. If X is a sensory area, x∈X is always supervised. The z∈Z is supervised only when the teacher chooses to. Otherwise, z gives (predicts) motor output.

The area function f which is based on the theory of Lobe Component Analysis (LCA), a model for self-organization by a neural area. We denote $\dot{v}$ as the vector of v with a unit Euclidean norm: $\dot{v}=v/\|v\|$. Each area A has a weight vector $v=(\dot{v}_b, \dot{v}_t)=(v_b/\|v_b\|, v_t/\|v_t\|)$. Its pre-response vector is:

$$r(v_b, b, v_t, t) = \dot{v} \cdot \dot{p} \qquad (3)$$

which measures the degree of match between the directions of weight vector v and the neuronal pre-synaptic vector $p=(\dot{b}, \dot{t})=(b/\|b\|, t/\|t\|)$.

To simulate lateral inhibitions (winner-take-all) within each area A, only top k winners among the c competing neurons fire. Considering k=1, the winner neuron j is identified by:

$$j = \underset{1 \leq i \leq c}{\operatorname{argmax}} r(v_{bi}, b, v_{ti}, t). \qquad (4)$$

The area dynamically scale top-k winners so that the top-k respond with values in (0, 1]. For k=1, only the single winner fires with response value yj=1 and all other neurons in A do not fire. The response value yj approximates the probability for $\dot{p}$ to fall into the Voronoi region of its $\dot{v}$ j where the "nearness" is $r(v_{bj}, b, v_{tj}, t)$.

All the connections in a Developmental Network are learned incrementally based on Hebbian learning—co-firing of the pre-synaptic activity $\dot{p}$ and the post-synaptic activity y of the firing neuron. If the pre-synaptic end and the post-synaptic end fire together, the synaptic vector of the neuron has a synapse gain y$\dot{p}$. Other non-firing neurons do not modify their memory. When a neuron j fires, its firing age is incremented nj←nj+1 and then its synapse vector is updated by a Hebbian-like mechanism:

$$vj \leftarrow w_1(n_j) vj + w_2(n_j) y_j \dot{p} \qquad (5)$$

where $w_2(n_j)$ is the learning rate depending on the firing age (counts) nj of the neuron j and $w_1(n_j)$ is the retention rate with $w_1(n_j) + w_2(n_j) \equiv 1$. Note that a component in the gain vector yj $\dot{p}$ is zero if the corresponding component in $\dot{p}$ is zero.

The simplest version of $w_2(n_j)$ is $w_2(n_j)=1/n_j$ which corresponds to:

$$v_j^{(i)} = \frac{i-1}{i} v_j^{(i-1)} + \frac{1}{i} \dot{p}(t_i), \; i = 1, 2 \ldots n_j, \qquad (6)$$

where ti is the firing time of the post-synaptic neuron j. The above is the recursive way of computing the batch average:

$$v_j^{(n_j)} = \frac{1}{n_j}\sum_{i=1}^{n_j} p(t_i) \quad (7)$$

since the average $\bar{x}(n)$ can be incrementally computed:

$$\bar{x}(n) = \frac{1}{n}\sum_{i=1}^{n} x_i = \frac{n-1}{n}\frac{1}{n-1}\sum_{i=1}^{n-1} x_i + \frac{1}{n}x_n = \frac{n-1}{n}\bar{x}(n-1) + \frac{1}{n}x_n.$$

All the Z neurons are supervised to fire according to the binary code of Z(ti). Because there is only one Y neuron firing with value 1 at any time and all other Y neurons respond with value 0, the input to Z is $\dot{p}=\dot{y}=y$. We can see that the Z neuron i has weight vector $v=(v_1, v_2, \ldots v_c)$ in which $v_j$ is the accumulated frequency $f_j/a_i$ for Y neuron j to fire right before the Z neuron i fires, $f_j$ is the number of firings of Y neuron j, and ai is the age of Z neuron i:

$$v = \left(\frac{f_1}{a_i}, \frac{f_2}{a_i}, \ldots, \frac{f_c}{a_i}\right), \text{ with } \frac{f_1}{a_i} + \frac{f_2}{a_i} + \ldots + \frac{f_c}{a_i} = 1.$$

Therefore, as long as the pre-action value of a Z neuron is positive, the Z neuron fires with value 1. Other Z neurons do not fire. We can see that the DN prediction of Z firing pattern is always perfect, as long as DN has observed the transition (q, σ) from the DFA and has been supervised on its Z for q/=δ(q,σ) when the transition (q, σ) is observed for the first time. No supervision is necessary later for the same transition (q, σ).

The prediction for X is similar than that for Z, if the X patterns are binary. Unlike Z, X prediction is not always perfect because DFA states are defined for producing the required symbols q, but not meant to predict X perfectly.

Autonomous Navigation as an Example Prototype

Traditional autonomous navigation systems for robotic and other transportation applications use laser range scanners to construct 3D driving scenes in terms of open and occupied voxels. Active laser range scanners suffer from a series of failures, such as wet road surfaces, dark surfaces and large object distance. In contrast, passive video cameras are inexpensive but processing is challenging. High dimensionality of the input image requires efficient Big Data analytic method for the system to perform in real-time. In this paper we argue that object recognition is essential for a navigation system to generalize learned landmarks to new driving scenes, which is a must for practical driving. We present an online learning neural network for indoor navigation using stereo cameras only. The network can learn a Finite Automaton for the driving problem. Transition of the Finite Automaton depends on several information sources: sensory input (stereo camera images) and motor input (i.e., object, action, GPS and attention). Our agent simulates the transition of the Finite Automaton by developing internal representation using the Developmental Network without handcrafting states or transition rules. Although the proposed network is meant for both indoor and outdoor navigation, it has been only experimented in indoor environments in current work. Our experiments show that the agent learned to recognize landmarks and the corresponding actions (e.g., follow the GPS input, correct current direction and avoid obstacles). The future work includes training and learning in outdoor driving situations.

Current state-of-the-art navigation systems for an open-world environment often use radar or scanning laser for obstacle perception. The 2006 DARPA Urban Challenge winner BOSS uses a combination of radar and sensors to generate a map of the road for sequential movement planning. Junior, the 2007 DARPA Urban Challenge winner, integrates a signal from 64-beam rotating LIDAR to generate 3D representation of the environment for mapping and localization. These approaches are based on expensive and constantly active scanners which suffer a series of failures, such as wet road surfaces, dark surfaces and large object distance.

Vision-based approaches, due to the challenge in processing high-dimensional input, often aim to find image patches that fits preselected templates corresponding to roads or intersections. The SCARF system constructs specific models for roads and intersections based on color information. ROBIN, a Radio-basis-function network, and ALVINN both generate steering signals based on input images. However, their application is limited to lane recognition which is only a partial solution of the autonomous driving problem. As is shown in FIG. 4, object recognition (recognizing traffic signs, pedestrians, cars and lanes) is more robust and generalizable compared to lane recognition approaches.

Some of the novel and important aspects of the system proposed in this disclosure may be summarized as follows:

1. Navigation system based on object recognition. We apply the Developmental Network as the internal brain of the autonomous navigation agent. The DN architecture is the basis of a series of visual recognition networks, i.e., the Where-What Networks that learn to recognize foreground objects directly from cluttered background. Object recognition helps the agent determine important features in the environment. Recognition of those features allows the learned concepts to be generalized over to unfamiliar environments.

2. Vision-based object recognition. The object recognition system is purely vision-based as opposed to laser-based range sensing methods. This means that our system can be built with off-the-shelf webcams instead of costly laser-ranged sensors. A vision-based approach means that the system needs more training to overcome lighting and appearance differences of the same object (day vs. night, snow vs. no snow). On the other hand, a camera, as a passive receptor instead of an active scanner (as in laser-based approach), is less likely to fail at wet road surfaces, dark surfaces and large object distance.

3. Real-time online learning with multiple concepts. The DN architecture allows the agent to learn multiple concepts incrementally instead of preprogramming control rules into a static control scheme. Online learning also minimizes the cost in teaching as there is no need to collect batches of training data with careful manual labeling. DN learns multiple concepts such as object type, location of the object and the corresponding action in this setting.

We have not looked into the problem of invariance issues in object recognition yet. In some ways, our current system can be viewed as a new born infant learning to crawl under the guidance of an external teacher. The agent may not have fully developed recognition capabilities, but the learned concepts and representations for recognition is of significant help for the agent to perform successfully in the current environment.

We explain the architecture of the system and the learning algorithm in the following section.

Network Structure for Autonomous Navigation

The Developmental Network architecture is conceptually shown in FIG. 3, but for autonomous navigation we need to teach another set of concepts.

A Developmental Network has three areas: a sensory area denoted as the X area, a hidden area denoted as the Y area, and a motor area denoted as the Z area. Neurons, located in the hidden area on a two-dimensional grid, accept global or partial input from the sensory input from their receptive fields. The connection between the hidden area and the motor area is bidirectional.

A Developmental Network is by itself an online learning system that constantly updates its Y area from the input in its X and Z area. The Z area serves as additional input area when the motors are supervised. On the other hand, when the agent is in testing phase, then Z area serves as output area where the agent performs movement corresponding to the firing pattern in Z.

We discuss how the network fires and updates its neurons in the next subsection.

Firing and Learning Algorithms

The internal area of the Developmental Network uses Lobe Component Analysis (LCA) as its learning algorithm, inspired by the six-layer structure of the laminar cortex.

Firing of neurons in the network goes through the following stages:

1. Similarity measure. At this stage, each neuron compares its received input with its stored pattern and uses the calculated similarity as its firing value.
2. Inhibition and lateral excitation. Neurons then compete to fire. We use top-k competition as a simulation of global dynamic inhibition among neurons. Lateral excitation is implemented to smoothen the weight space according to the geometric location of the firing neuron so that neurons storing similar patterns would cluster together.
3. Hebbian learning. Hebbian learning takes place in firing neurons. The input that triggers firing in each neuron would be remembered as an incremental average to the existing weight vector.

Note that the connection between the hidden area and the motor area is bidirectional, thus the input is made up of two parts: bottom-up input from the sensors, and the top-down input from the supervised (or emergent in the case of reinforcement learning scenario) response values in the motor area.

The firing pattern of the Developmental Network is illustrated in FIG. 5.

Similarity Measure

The pre-response of the bottom-up response in each neuron is calculated as follows:

$$\hat{r}_{u,i} = \frac{X_t}{\|X_t\|} \cdot \frac{W_{u,i}}{\|W_{u,i}\|} \tag{8}$$

where xt is the sensory input vector from X area at time t, wu,i is the bottom-up weight of that neuron. The brackets indicate inner product of two unit vectors. This calculates the similarity between the stored pattern (i.e. wu,i) and the input vector. ru,i is then calculated from $\hat{r}_{u,i}$ by prescreening modeled by top-k competition.

Similarly, we can use zt to calculate the top-down response rd,i for each neuron by replacing the xt in eq. (8) with zt.

We discuss top-k competition in the next paragraph.

Inhibition and Lateral Excitation

After each neuron i computes its bottom-up response value, ru,i, and top-down response value, rd,i, the neuron sets its pre-response value to be the average of the two values.

$$r_i = \frac{1}{2}(r_{u,i} + r_{d,i}) \tag{9}$$

The final neuron response in the Y area is given by top-k competition. The k neurons with the highest pre-response value would fire with the adjusted responses while other neurons would be suppressed. To adjust the response values based on their ranking:

$$r' = \begin{cases} r \cdot (r - r_{k+1})/(r_1 - r_{k+1}) & r_{k+1} \leq r \leq r_1 \\ 0 & \text{otherwise} \end{cases}$$

where r1 is the highest response value; rk+1 is the k+1th highest response value. Lateral excitation takes place when the firing age of the winning neuron is less than tl. If the condition is satisfied, the firing neuron would trigger firing in its neighboring neurons with rexcite=0.5 ri, where rexcite represents the response of the laterally excited neurons, and ri is the response of the firing neuron. Lateral excitation helps to organize the neurons so that neurons with similar weights would be located near each other. In our experiment, we set tl=3.

Hebbian Learning

If a neuron wins in the multistep lateral competition described above (meaning that its firing rate is larger than zero), its bottom-up weight and top-down weight would update using the following Hebbian learning rule:

$$w_{u,i} \leftarrow \beta_1 w_{u,i} + \beta_2 r_i x_t$$

where β1 and β2 determine retention and learning rate of the neuron, respectively:

$$\beta_1 = \frac{m_i - 1 - \mu(m_i)}{m_i}, \beta_2 = \frac{1 + \mu(m_i)}{m_i} \tag{10}$$

with β1+β2≡1, mi is the neuron's firing age, i.e. mi=1 in the beginning of training, and increments by one every time the neuron wins lateral competition.

In our setup, μ is a monotonically increasing function of mi that prevents the learning rate β2 from converging to zero as mi increases. μ is of the highest value (neuron learns input at higher learning rate) at certain stages of its entire firing history:

$$\mu(m_i) = \begin{cases} 0, & \text{if } m_i < t_1 \\ c(m_i - t_1)/(t_2 - t_1), & \text{if } t_1 < m_i < t_2 \\ c + (m_i - t_2)/\gamma, & m_i > t_2 \end{cases} \tag{11}$$

μ is necessary to allow the firing neuron to learn new information and forget old knowledge acquired a long time ago. We used typical value t1=10, t2=103, c=1 and y=104 in the experiment.

Developmental Network with Multiple Concept Zones

It is possible to construct a Developmental Network with multiple sensory areas and/or multiple motor areas.

U.S. Pat. No. 8,694,449 can serve as an embodiment of the Developmental Network. It learns to recognize the type and location information of different foreground objects simultaneously directly from cluttered images. It achieves this by separating the location motor from the type concept motor.

In the navigation experiments discussed below we are using two sensory areas (Xleft and Xright) and four motor areas (ZM for motor action, ZG for internal intention corresponding to the GPS input), ZR for object recognition, and ZA for attention of the agent). The network would thus have two sets of bottom-up weights: wleft for the image from the left camera and wright for the image from the right camera. The network also has four sets of top-down weights for each of the motor concepts. The final response calculated in Eq. 9 would then be calculated as:

$$r_{u,i} = \frac{1}{2}(r_{u,i}^{left} + r_{u,i}^{right}) \quad (12)$$

$$r_{d,i} = \frac{1}{4}(r_{d,i}^{M} + r_{d,i}^{G} + r_{d,i}^{R} + r_{d,i}^{A}) \quad (13)$$

$$r_i = \frac{1}{2}(r_{u,i} + r_{d,i}) \quad (14)$$

Developmental Network Simulates Finite Automata

A generative Developmental Network (GDN) is able to simulate any Finite Automata error-free. As our Developmental Network is limited by its computation resources and training time, the Developmental Network is simulating the behavior of the generative Developmental Network that corresponds to the Finite Automata of the autonomous navigation problem. Part of such a Finite Automata is presented in FIG. 7. As is shown in the image, the corresponding Finite Automata of two simple actions are already complicated with several internal states and transition rules. Integration of these two Finite Automata (and other Finite Automata for the navigation problem) would be hard and time-consuming. Once hand-crafted, the Finite Automata are not able to learn new concepts. The weight (transition rules) would be frozen and thus the Finite Automaton cannot be generalized to another environment.

Our agent learns the transition table incrementally without handcrafted transition rules. The agent forms concepts and learns to recognize objects online and incrementally.

An example of how the agent learns the rule "move slightly right when seeing wall on the left hand side" is provided in Table 3. The update flowchart of the Developmental Network can be found in FIG. 8.

Indoor Navigation Experiments

In this section we describe the detail about our indoor navigation experiment, where we implement the network described in previous sections, on to a mobile cart and train it to learn to self-navigate on the 2nd and 3rd floor of Engineering Building, Michigan State University.

Agent Setup

The agent is made up of the following components, as shown in FIG. 6:

1. Xleft and Xright: Two Logitech QuickCam Orbit MP Webcam. The network grabs real-time input from the dual cams as fast as possible. The input images are resized to 38 by 38 black white before they are passed into the network. The input images are then reshaped to a column vector and passed into the Y area for feature extraction.

2. Y: The hidden area where the neurons are located. There are two different Y layers in the current experiment. As is shown in Table 4. There are 20*20*6 neurons in layer 1, with all of the receptive field of size 19 pixels. There are 18*18*6 neurons in layer 2, with all of the receptive field of size 21 pixels.

3. ZM: Motor to generate 6 actions in different directions for the agent to move around. At current stage the motor is replaced by human pusher carrying out the action as is observed in GUI window 13, FIG. 9. See FIG. 9 for detail.

4. ZG: Simulated GPS input information which serves as the agent's internal intention. Intention is important for the agent to make decisions of its action during cross roads. The simulated GPS provides the agent information about the relative location of the next key landmark (i.e., forward, left, right or arrive).

5. ZR: Object recognition. This concept zone is used to recognize the current object (walls, pedestrians) that are most relevant to the next action. The agent should only recognize that object if its action is relevant to that object. If a person is far away but still visible, the agent is not required to recognize that object. A setting with no objects in the agent's path would be recognized as an open setting.

6. ZA: Attention of the agent. In this concept zone the agent reports where its attention is based on the current input images. In this work, the attention concept is pre-developed and hard-wired according to the location of the corresponding neuron. The neurons located at the upper left corner of the hidden area are connected to the upper left concept zones. This allows for faster convergence of the weights during the learning process.

The graphical user interface (GUI) to train and test the agent is shown in FIG. 9. The number of the following discussion corresponds to the number areas in FIG. 9:

TABLE 3

| The network flow chart to learn the rule "move slightly right when see wall on the left hand side". | | | | | | | |
|---|---|---|---|---|---|---|---|
| | Network update | i − 1 | i | i + 1 | i + 2 | i + 3 | Testing |
| $Z_M$ | supervised | * | * | SR | SR | SR | * |
| | emergent | F | F | F | F | SR | SR |
| $Z_G$ | | F | F | F | F | F | F |

TABLE 3-continued

The network flow chart to learn the rule "move slightly right when see wall on the left hand side".

| Network update | | i − 1 | i | i + 1 | i + 2 | i + 3 | Testing |
|---|---|---|---|---|---|---|---|
| $Z_R$ | supervised | * | * | W | W | W | * |
|  | emergent | Op | Op | Op | Op | W | Op |
| $Z_A$ | sepervised | * | * | L | L | L | * |
|  | emergent | ? | ? | ? | ? | L | L |
| Y: top down | | ? | ? | ? | (SR, F, W, L) | (SR, F, W, L) | (SR, F, W, L) |
| Y: bottom up | | ? | Op | wall on left | wall on left | wall on left | wall on left |
| X (stereo image) | | Op | wall on left | wall on left | wall on left | wall on left | wall on left |
| Description | | detail[1] | detail[2] | detail[3] | detail[4] | detail[5] | detail[6] |

Detail:
X is always supervised with the input images from stereo camera
$Z_G$ is always supervised with the input from GPS
[1]Agent is in open setting. Agent moves forward with or without supervision.
[2]Wall on left in sight. Without teaching, agent still moves forward.
[3]Teacher observes the incorrect movement and supervises the movement of the agent.
Teacher supervises $Z_M$, $Z_R$ and $Z_A$
[4]Agent updates Y area firing response with supervised input.
Agent updates Z(emergent) using previous Y.
[5]Agent updates Z(emergent) using updated Y.
Correct neuron in Z fires. The agent learns the correct response.
[6]Agent learns the corret movement. Performs correctly without supervision.
"*" means free from supervision.
"?" means random Z neuron firing previous to learning.
X is the input area.
Z is the effector of the agent.

TABLE 4

Navigation experiment network detail

| Zones | Number of neurons | Detail |
|---|---|---|
| $X_{left}$ | 38 × 38 matrix, real value | reshaped to 1 × 1444 and normalized |
| $X_{left}$ | 38 × 38 matrix, real value | reshaped to 1 × 1444 and normalized |
| Y | layer 1: 20 × 20 × 6 neurons | layer 1: receptive field size 19 |
|  | layer 2: 19 × 19 × 6 neurons | layer 2: receptive field size 20 |
| $Z_M$ | 6 neurons | corresponding to 6 motor actions |
| $Z_G$ | 4 neurons | corresponding to 4 GPS inputs |
| $Z_R$ | 3 neurons | corresponding to 3 settings |
| $Z_A$ | 5 neurons | corresponding to 5 attention regions |

Training and Testing

The nine tasks for the agent to learn are shown in FIGS. 10a-10i. There are two rounds of training. Real-time testing is performed after these two rounds of training are complete.

1. Round 1. Training with complete data. During this round the agent is trained with real-time input with detailed information of current setting and the hint of attention (supervised ZR and ZA input). Teaching cost is much higher during this round as the teacher needs to provide information of all four motors. Training with 1800 fully supervised actions takes about 4 hours.

2. Round 2. Training with incomplete data. During this round the agent is trained with real-time input with only ZM and ZG being supervised. Teaching cost is reduced significantly as the teacher is relieved from the burden of supervising each motor input. Training with 1400 actions takes about 2 hours.

Sample training and testing videos are available at the following URL address:

1. Real time training and testing turning left. Video at https://www.youtube.com/watch?v=TySGYe5EYFc.

2. Real time training moving forward. Video at https://www.youtube.com/watch?v=c2bgvDV1d M8.

Training was performed on the 3rd floor of the Engineering Building, Michigan State University. Testing was performed on the 2nd and 3rd floors of the same building. Sample training and testing images are shown in FIG. 12.

There are three stages of testing:

1. Resubstitution testing. We randomly store 900 training samples from the first round of training. We present the images to the trained network to test its performance on responsive action and object recognition. Result of resubstitution testing is shown in Table 6.

2. Real-time navigation on same setting at different starting points (validation testing). After training round 1 and training round 2, we let the agent navigate on its own on the 3rd floor of the Engineering Building. The agent has already been trained with the same settings but the starting point of each action would be different. The testing samples are similar to the training samples with slight view angle change due to the different starting points. Testing result in this stage is shown in Table 7.

3. Generalization testing on novel settings. Final stage of testing is performed on novel settings on the 2nd floor of the Engineering Building, MSU. The testing settings has never been viewed by the agent and the agent needs to transfer what it has learned on the 3rd floor to the current new settings. Testing result in this stage is shown in Table 5.

TABLE 5

Result of generalization test

| Correct Action | No. of testing | Inconsistent | Failed action |
|---|---|---|---|
| Foward | 1170 | 37 (3.16%) | 4 |
| Left | 64 | 6 (9.38%) | 0 |
| Right | 80 | 19 (23.75%) | 1 |
| Slightly Left | 196 | 14 (7.14%) | 0 |
| Slightly Right | 193 | 10 (5.18%) | 0 |
| Stop | 50 | 0 (0%) | 0 |
| Total | 1703 | 86 (5.05%) | 5 |

Testing performed on 2nd floor, Engineering Building, MSU. No training is performed at this location.

Experiment Result

Experiment results are presented in Table 5, Table 6, and Table 7. Sample testing routes are shown in FIGS. 11a-11e.

We stored 900 actions and the corresponding motor inputs ZM, ZG, ZR and ZA. We report the accuracy of the agent's action and object recognition in Table 6. Note that the object is labeled as most relevant object to the next action of the agent's action. Thus the agent is not required to recognize pedestrians or walls far away from its location.

In real-time testing, we report performance of the agent in two categories: inconsistent with teacher's intention and failed action. For example, in an open setting with ZG=F, the correct action would be to move forward. If the agent's movement is inconsistent with the correct action, then we increment the counting of the first category by one. However, this may not necessarily be a failed action. Often in the experiment we found that the agent is able to correct itself by adjusting its directions. An action would only be defined as failed when the agent bumps into a wall or pedestrian, or when the agent is stuck at the current setting with output as ZM=stop.

Sample testing routes taken by the agent during validation testing are presented in FIGS. 11a-11e. In each subfigure we present one perfect route, one inconsistent route, and one failed route (if failure is observed). The agent failed at setting (c), (d) and (e). In (c) the agent is stuck in the corner and stops when it hit the wall. It tried to avoid the protruding corner and failed to recover from the situation. In (d) the agent stopped when it was too close to the door while the correct action should be slightly left to avoid the obstacle. In (e) the agent stops when a pedestrian is walking away from the agent while the correct action should be follow the pedestrian as there is no need to stop.

Discussions for the Navigation Example

In the experiment we present our agent for autonomous navigation. To sum up, the agent goes through the following steps to generate the final motor output:

1. Recognize important landmarks (walls, pedestrians, or open settings) via bottom-up response calculation and top-k competition. The bottom-up response is appearance-based. This means that our network needs more computation resources (e.g., number of neurons) to handle the appearance variance. On the other hand, landmarks help the agent to successfully navigate even in unfamiliar environments, as is demonstrated in the generalization test.

2. Combines bottom-up response with previous motor states (top-down response form Z) to generate current action. Top-down response enables the agent to generate sequential movement. This means that our agent is not a responsive agent (which is purely bottom-up response-based), but an agent that can learn transition between states incrementally without handcrafting transition rules.

The agent is robust against different orientation in the hallways. As is shown in FIGS. 10a-10i, we train the agent to recognize walls and adjust its direction when it sees walls on its left- or right-hand side. Although we did not train the agent to handle different directions at all locations in the Engineering building, the agent learns to recognize object wall with 92.22% accuracy, which means that the agent is able to generalize its learned concept to unfamiliar settings. This is demonstrated in Table 6.

Conclusions for the Navigation Example

In this disclosure we present our approach in constructing an on-line learning agent for self-navigation based on object recognition. The agent is purely vision-based with inexpensive webcams in comparison with the laser-based approaches with costly scanners that suffers from a series of failures such as wet road surfaces, dark surfaces and large object distance. The agent is able to attend to important objects in the current visual input and take corresponding actions according to the recognition result. The system learns online and performs in real-time, minimizing cost of data collection and manual labeling. Our agent demonstrated robust performance in validation and generalization testing scenarios. The next step in our research is to apply our system to outdoor environment navigation instead of structured indoor environment. Challenges include increased appearance variances compared to the current experiment and large network size, which may slow down the real-time learning.

TABLE 6

Result of resubstitution test

| Testing mode | | Number of training actions | | | |
|---|---|---|---|---|---|
| | | 1800 | 2700 | 3600 | 4500 |
| Action accuracy | $Z_R, Z_A$ free | 98.25% | 99.01% | 99.01% | 98.58% |
| | $Z_R, Z_A$ supervised | 98.90% | 99.89% | 99.45% | 99.56% |
| Object recognition accuracy | $Z_A$ free | 89.81% | 91.24% | 92.22% | 91.57% |
| | $Z_A$ supervised | 91.35% | 91.35% | 90.04% | 91.68% |

Testing and training performed on 3rd floor. Testing performed using stored 900 training samples with careful manual labeling.

TABLE 7

Training detail and result of validation test.

| Correct Action | Type of training | No. of training | No. of testing | Inconsistent | Failed action |
|---|---|---|---|---|---|
| Forward | round 1 | 946 | 1198 | 91 (7.6%) | 4 |
| | round 2 | 640 | | | |
| Left | round 1 | 104 | 97 | 7 (7.21%) | 0 |
| | round 2 | 138 | | | |
| Right | round 1 | 84 | 86 | 1 (1.16%) | 0 |
| | round 2 | 150 | | | |
| Slightly Left | round 1 | 155 | 178 | 20 (11.23%) | 0 |
| | round 2 | 290 | | | |
| Slightly Right | round 1 | 178 | 160 | 21 (13.12%) | 0 |
| | round 2 | 290 | | | |
| Stop | round 1 | 68 | 42 | 0 (0%) | 0 |
| | round 2 | 72 | | | |
| Total | | 3115 | 1761 | 140 (7.95%) | 4 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A robotic system comprising:
an electronic controller;
at least one sensor coupled to the controller and responding to a physical property within a sensed environment;

at least one effector coupled to the controller and configured to perform physical manipulation within the sensed environment;

the controller having a processor and a non-transitory computer-readable memory coupled thereto to implement a neural network comprising a plurality of interconnected neurons organized in said memory to define plural areas, including an X area coupled to communicate data with said at least one sensor, a Y area coupled to communicate data with said X area, and a Z area coupled to communicate data with said Y area and further coupled to said at least one effector; and the processor being further programmed to:
implement a developmental program that communicates with the X area, the Y area, and the Z area to regulate the neural network, wherein the regulation results in an emergent Turing Machine within the neural network, and mediate an emergent learning process by which the X area, Y area, and Z area are trained in response to signals supplied through at least one of said X area and said Z area, wherein:
the neural network is a developmental network that is controlled by the emergent Turing Machine, and
the developmental network updates (i) in synchronism with a predetermined clock cycle and (ii) at least twice for each transaction of a teacher Turing Machine.

2. The robotic system of claim 1 wherein said developmental network includes an interface to the Y area, wherein the interface is configured to provide a teaching path for the X area, the Z area, and the teacher Turing Machine, and
wherein computations and updates performed by the Y area are regulated by the developmental program based on inputs from the X area, the Y area, and the Z area.

3. The robotic system of claim 1 wherein the developmental network is programmed by the developmental program without handcrafted states or handcrafted transition rules; and
wherein the teacher Turning Machine is a symbolic Turing Machine.

4. A developmental neural network comprising:
a processor and a non-transitory computer-readable memory coupled thereto to implement the neural network comprising a plurality of interconnected neurons organized in said memory to define plural areas, including an X area coupled to communicate data with at least one sensor, a Y area coupled to communicate data with said X area, and a Z area coupled to communicate data with said Y area and further coupled to at least one effector; and
the processor being further programmed to:
implement a developmental program that communicates with the X area, the Y area, and the Z area to regulate the neural network, wherein the regulation results in an emergent Turing Machine within the neural network, and
to mediate an emergent learning process by which the X area, the Y area, and the Z area are trained in response to signals supplied through at least one of the X area, the Y area, the Z area,
wherein:
the emergent Turing Machine controls the developmental neural network, and
the developmental neural network updates (i) in synchronism with a predetermined clock cycle and (ii) at least twice for each transaction of a teacher Turing Machine.

5. The developmental neural network of claim 4 further comprising an interface to the Y area that is configured to provide a teaching path for the X area, the Z area, and the teacher Turing Machine,
wherein computations and updates performed by the Y area are regulated by the developmental program based on inputs from the X area, the Y area, and the Z area.

6. A method of controlling a robotic system of the type having an electronic controller, at least one sensor coupled to the controller and responding to a physical property within a sensed environment and at least one effector coupled to the controller and configured to perform physical manipulation within the sensed environment, comprising:
operating a processor having a non-transitory computer-readable memory coupled thereto to implement a neural network comprising a plurality of interconnected neurons organized in said memory to define plural areas, including an X area coupled to communicate data with said at least one sensor, a Y area coupled to communicate data with said X area, and a Z area coupled to communicate data with said Y area and further coupled to said at least one effector;
using the processor to implement a developmental program that communicates with the X area, the Y area, and the Z area to regulate the neural network, wherein the regulation results in an emergent Turing Machine within the neural network; and
using the processor to mediate an emergent learning process by which the X area, the Y area, and the Z area are trained in response to signals supplied through at least one of said X area and said Z area,
wherein:
the neural network is a developmental network controlled by the emergent Turing Machine, and
the developmental network updates (i) in synchronism with a predetermined clock cycle and (ii) at least twice for each transaction of a teacher Turing Machine.

7. A method of training a computer-implemented developmental neural network comprising:
using a processor having a non-transitory computer-readable memory coupled thereto to implement the neural network comprising a plurality of interconnected neurons organized in said memory to define plural areas, including an X area coupled to communicate data with at least one sensor, a Y area coupled to communicate data with said X area, and a Z area coupled to communicate data with said Y area and further coupled to at least one effector;
using said processor to implement a developmental program that communicates with the X area, the Y area, and the Z area to regulate the neural network, wherein (i) the regulation results in an emergent Turing Machine within the neural network and (ii) the developmental neural network is controlled by the emergent Turing Machine;
using said processor to mediate an emergent learning process by which the X area, the Y area, and the Z area, are trained in response to signals supplied through at least one of the X area and the Z area; and using said processor to update the developmental neural network (i) in synchronism with a predetermined clock cycle and (ii) at least twice for each transaction of a teacher Turing Machine.

8. The method of claim 7 further comprising providing the developmental neural network with an interface to the Y area, wherein the interface is configured to provide a teaching path for the X area, the Z area, and the teacher Turing Machine,
wherein computations and updates performed by the Y area are regulated by the developmental program based on inputs from the X area, the Y area, and the Z area.

9. The robotic system of claim 1 wherein:
the Y area includes a plurality of neurons,
each neuron of the plurality of neurons is assigned at least one of a set of top-down weights based on patterns in the Z area and a set of a bottom-up weights based on patterns in the X area, and
the Y area is trained based on at least one of the set of top-down weights and the set of the bottom-up weights.

10. The robotic system of claim 9 wherein each weight of the set of top-down weights corresponds to (i) one or more states or (ii) one or more actions of the emergent Turing Machine, and
the emergent Turing Machine automatically forms a concept hierarchy based on the set of top-down weights and set of bottom-up weights.

11. The robotic system of claim 1 wherein:
the Y area includes a plurality of neurons,
the Z area includes a first pattern that corresponds to (i) a first state or (ii) a first action of the emergent Turning Machine,
the X area includes a second pattern that corresponds to (i) a second state or (ii) a second action of the emergent Turing Machine, and
the developmental network is configured to (i) match the first pattern to any neuron of the plurality of neurons of the Y area and (ii) match the second pattern to any neuron of the plurality of neurons of the Y area.

12. The developmental neural network of claim 4 wherein:
the Y area includes a plurality of neurons,
each neuron of the plurality of neurons is assigned at least one of a set of top-down weights based on patterns in the Z area and a set of bottom-up weights based on patterns in the X area,
each weight of the set of top-down weights corresponds to (i) one or more states or (ii) one or more actions of the emergent Turing Machine,
the Y area is trained based on at least one of the set of top-down weights and the set of bottom-up weights, and
the emergent Turing Machine automatically forms a concept hierarchy based on the set of top-down weights and the set of bottom-up weights.

13. The developmental neural network of claim 4 wherein:
the Y area includes a plurality of neurons,
the Z area includes a first pattern that corresponds to (i) a first state or (ii) a first action of the emergent Turning Machine,
the X area includes a second pattern that corresponds to (i) a second state or (ii) a second action of the emergent Turing Machine, and
the developmental neural network is configured to (i) match the first pattern to any neuron of the plurality of neurons of the Y area and (ii) match the second pattern to any neuron of the plurality of neurons of the Y area.

14. The method of claim 6 wherein:
the Y area includes a plurality of neurons,
each neuron of the plurality of neurons is assigned at least one of a set of top-down weights based on patterns in the Z area and a set of bottom-up weights based on patterns in the X area,
each weight of the set of top-down weights corresponds to (i) one or more states or (ii) one or more actions of the emergent Turing Machine,
the Y area is trained based on at least one of the set of top-down weights and the set of bottom-up weights, and
the emergent Turing Machine automatically forms a concept hierarchy based on the set of top-down weights and the set of bottom-up weights.

15. The method of claim 6 wherein the developmental network includes an interface to the Y area, wherein the interface is configured to provide a teaching path for the X area, the Z area, and the teacher Turing Machine, and
wherein computations and updates performed by the Y area are regulated by the developmental program based on inputs from the X area, the Y area, and the Z area.

16. The method of claim 6 wherein regulating the neural network includes regulating, by the developmental program, the developmental network without handcrafted states or handcrafted transition rules, and
wherein the teacher Turing Machine is a symbolic Turning Machine.

17. The method of claim 7 wherein the developmental neural network is regulated by the developmental program without handcrafted states or handcrafted transition rules; and
wherein the teacher Turing Machine is a symbolic Turning Machine.

18. The method of claim 7 wherein:
the Y area includes a plurality of neurons,
each neuron of the plurality of neurons is assigned at least one of a set of top-down weights based on patterns in the Z area and a set of bottom-up weights based on patterns in the X area, and
the Y area is trained based on at least one of the set of top-down weights and the set of bottom-up weights.

19. The method of claim 18, wherein each weight of the set of top-down weights corresponds to (i) one or more states or (ii) one or more actions of the emergent Turing Machine, and
the emergent Turing Machine automatically forms a concept hierarchy based on the set of top-down weights and the set of bottom-up weights.

20. The method of claim 7 wherein:
the Y area includes a plurality of neurons,
the Z area includes a first pattern that corresponds to (i) a first state or (ii) a first action of the emergent Turning Machine,
the X area includes a second pattern that corresponds to (i) a second state or (ii) a second action of the emergent Turing Machine, and
the developmental neural network is configured to (i) match the first pattern to any neuron of the plurality of neurons of the Y area and (ii) match the second pattern to any neuron of the plurality of neurons of the Y area.

* * * * *